United States Patent
Koren et al.

(10) Patent No.: US 10,796,075 B2
(45) Date of Patent: Oct. 6, 2020

(54) SYSTEM AND METHOD FOR THE GENERATION AND EDITING OF TEXT CONTENT IN WEBSITE BUILDING SYSTEMS

(71) Applicant: Wix.com Ltd., Tel Aviv (IL)

(72) Inventors: Dan Koren, San Francisco, CA (US); Erez Shasha, Kiryat Ono (IL); Eyal Sadeh, Beersheva (IL); Rachel Rowland, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 75 days.

(21) Appl. No.: 16/202,174

(22) Filed: Nov. 28, 2018

(65) Prior Publication Data

US 2019/0163728 A1    May 30, 2019

Related U.S. Application Data

(60) Provisional application No. 62/591,297, filed on Nov. 28, 2017.

(51) Int. Cl.
*G06F 40/137* (2020.01)
*G06F 16/9532* (2019.01)
(Continued)

(52) U.S. Cl.
CPC .......... *G06F 40/137* (2020.01); *G06F 16/958* (2019.01); *G06F 16/9532* (2019.01); *G06F 40/131* (2020.01); *G06F 40/14* (2020.01); *G06F 40/166* (2020.01); *G06F 40/186* (2020.01); *G06F 40/216* (2020.01); *G06F 40/30* (2020.01); *G06F 3/0482* (2013.01); *G06F 40/20* (2020.01); *G06N 5/04* (2013.01); *G06N 20/00* (2019.01)

(58) Field of Classification Search
CPC .................................................. G06F 40/103
See application file for complete search history.

(56) References Cited

U.S. PATENT DOCUMENTS 9,747,258 B2    8/2017    Ben-Aharon
9,996,566 B2    2/2018    Ben-Aharon
(Continued)

OTHER PUBLICATIONS

International Search Report for corresponding PCT application PCT/IB2018/059411 dated Apr. 1, 2019.

*Primary Examiner* — Scott T Baderman
*Assistant Examiner* — Steve P Golden
(74) *Attorney, Agent, or Firm* — Heidi Brun Associates LTD.

(57) ABSTRACT

A tool for a website building system (WBS) includes a database storing text options formed of a hierarchical data structure (HDS) associated with a field role, based on information gathered internally and externally to the WBS, each HDS having nodes and sub-trees representing field content, text paragraphs and sentences; a role determiner to determine a field role for an editable text field of a web site edited or generated with said WBS; an analysis engine to make at least one text option recommendation from the database for the field role; an HDS editor to enable a user to select one recommended text option and to edit a local instance of an HDS of the text option including editing nodes and sub-trees of a local instance of the HDS and a text generator to linearize the local instance and to generate the text for site generation for an editor of the WBS.

38 Claims, 13 Drawing Sheets

(51) Int. Cl.
  *G06F 16/958*  (2019.01)
  *G06F 40/14*  (2020.01)
  *G06F 40/30*  (2020.01)
  *G06F 40/131*  (2020.01)
  *G06F 40/166*  (2020.01)
  *G06F 40/186*  (2020.01)
  *G06F 40/216*  (2020.01)
  *G06N 20/00*  (2019.01)
  *G06N 5/04*  (2006.01)
  *G06F 3/0482*  (2013.01)
  *G06F 40/20*  (2020.01)

(56) References Cited

U.S. PATENT DOCUMENTS

| | | |
|---|---|---|
| 10,073,923 B2 | 9/2018 | Koren |
| 10,176,154 B2 | 1/2019 | Ben-Aharon |
| 10,185,703 B2 | 1/2019 | Abrahami |
| 2013/0219263 A1* | 8/2013 | Abrahami ............ G06F 40/117 715/234 |
| 2013/0232539 A1 | 9/2013 | Polunin et al. |
| 2014/0282218 A1 | 9/2014 | Kaufman |
| 2016/0125462 A1 | 5/2016 | Mallah et al. |
| 2017/0169010 A1 | 6/2017 | Hurst |
| 2017/0192956 A1 | 7/2017 | Kaiser et al. |
| 2017/0344656 A1* | 11/2017 | Koren .................. G06Q 10/101 |
| 2018/0293323 A1 | 10/2018 | Abrahami |
| 2018/0373799 A1* | 12/2018 | Koren .................. G06F 16/958 |

\* cited by examiner

WiXStory ☰     Home > About     ×
···

About

Content | Layout | Design

☑ Title
    About Title
☐ Subtitle
    About Subtitle
☑ Paragraph

[ help meeeeee! ]

At Wix.com the foundation for our work is simple: the more value for our client — the more value for our business. Wix.com started up in 2000, and we've been on an epic ride ever since. At Wix.com out passion for excellence is endless. What sets us apart from the rest? Our dedication, expertise and

[ Save ]
[ Publish ]
[ Preview ]

eyal new test3
Bref writing  >
en  >

📄 Pages
Header  ⊚
Footer  ⊚
🎨 Style
▽ Actions

---

Text Wizard

About Texts

Erez is the brainchild of Jeff Case who has a vision of what website builder services should be. Established in 2003, we're proud to have produced 17 years of happy customers, We love our work, and we like to think we're pretty darn good at it too. How do we do things differently than our competitors? quality service, fair and affordable prices and friendly customer service. We have 3 locations: we were first founded in SeaTac, and have since opened branches in Lose Angeles and Philadelphia.

We take pride in the website builder work we do and in the long term relationships we've built with our clients. Who's on our team? The best and brightest of course. We wouldn't have it any other way. Join the thousands of satisfied clients who chose Erez for their website builder needs. Our work has been recognized by publications including The Seattle Gazette SeaTac Times and HVAC Journal. So, how can we help you? Contact us to get the conversation going! Or, connect with us on Facebook to stay in the know.

Writing better text tips|Hire a pro

[ Add to Site ]

Tell Us

FIG. 12C

SYSTEM AND METHOD FOR THE GENERATION AND EDITING OF TEXT CONTENT IN WEBSITE BUILDING SYSTEMS

CROSS REFERENCE TO RELATED APPLICATIONS

This application claims priority from U.S. Provisional Patent Application 62/591,297 filed Nov. 28, 2017 which is incorporated herein by reference.

FIELD OF THE INVENTION

The present invention relates to website building systems generally and to text content generation in particular.

BACKGROUND OF THE INVENTION

Website building systems are used by both novices and professionals to create interactive websites. Existing website building systems are based on a visual editing model and most website building systems typically provide multiple templates, with a template possibly including a complete sample website, a website section, a single page or a section of a page.

Website building system users (also known as designers, subscribers, subscribing users or site editors) may design the website and the website's end-users (the "users of users") may access the websites created by the users. Although end-users typically access the system in read-only mode, website building systems (and websites) may allow end-users to perform changes to the web site such as adding or editing data records, adding talkbacks to news articles, adding blog entries to blogs etc. The website building system may in fact allow multiple levels of users (i.e. more than two levels), and assign different permissions and capabilities to each level. Users of the website building system (in particular in the full or partial on-line configurations described below) may register in the website building system server which manages the users, their web sites and accesses by the end-users.

A website building system may be a standalone system, or may be embedded inside a larger editing system. It may also be on-line (i.e. applications are edited and stored on a server), off-line or partially on-line (with web sites being edited locally but uploaded to a central server for publishing). The website building system may use an internal data architecture to store website building system based sites and this architecture may organize the handled sites' internal data and elements inside the system. This architecture may be different from the external view of the site (as seen, for example, by the end-users). It is also typically different from the way the HTML pages sent to the browser are organized.

For example, the internal data architecture may contain additional properties for each element in the page (creator, creation time, access permissions, link to templates, SEO (search engine optimization) related information etc.) which are relevant for the editing and maintenance of the site in the website building system, but are not externally visible to end-users (or even to some editing users). The website building system may implement some of its functionality (including both editing and run-time functionality) on a server or server set, and some of its functionality on client elements. The website building system may also determine dynamically whether to perform some functionality on the server or on the client platform.

A website building system typically handles the creation and editing of visually designed applications (such as a website) consisting of pages, containers and components. Pages may be separately displayed and contains components. Components may include containers as well as atomic components.

The website building system may support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously.

The components may be content-less, or have internal content. An example of the first category is a star-shape component, which does not have any internal content (though it has color, size, position and some other parameters). An example of the second category is a text paragraph component, whose internal content includes the internal text as well as font, formatting and layout information. This content may, of course, vary from one instance of the text paragraph component to another. Components which have content are often referred to as fields (e.g. a "text field").

Pages may use templates, general page templates or component templates. Specific cases for templates include the use of an application master page containing components replicated in all other regular pages, and the use of an application header or footer (which repeat on all pages). Templates may be used for the complete page or for page sections. The website building system may provide inheritance between templates, pages or components, possibly including multi-level inheritance, multiple inheritance and diamond inheritance (i.e. A inherits from B and C and both B and C inherit from D).

The visual arrangement of components inside a page is called a layout. The website building system may also support dynamic layout processing, a process whereby the editing of a given component (or other changes affecting it such as externally-driven content change) may affect other components, as further described in US Patent Publication No. 2013/0219263 entitled "Website Design System Integrating Dynamic Layout and Dynamic Content" published 22 Aug. 2013 and assigned to the common assignee of the present invention and incorporated herein by reference.

A website building system may be extended using a third party application and its components as well list applications (such as discussed in US Patent Publication No. US 2014/0282218 entitled "Website Building System Integrating Data Lists with Dynamic Customization and Adaptation" published 18 Sep. 2014 and assigned to the common assignee of the present invention and incorporated herein by reference). These third party applications and list applications may be added and integrated into designed websites.

Such third party applications and list applications may be purchased (or otherwise acquired) through a number of distribution mechanisms, such as being pre-included in the website building system design environment, from an Application Store (integrated into the website building system or external to it) or directly from the third party application vendor.

The third party application may be hosted on the website building system vendor's own servers, the third party application vendor's server or on a 4th party server infrastructure.

The website building system may also allow procedural code to be added to some or all of the system's entities. Such code could be written in a standard language (such as JavaScript), an extended version of a standard language or a language proprietary to the specific website building system. The executed code may reference API's provided by the website building system itself or external providers. The code may also reference internal constructs and objects of the website building system, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions.

The activated code may be executed inside the website building system's client element, on the server platform or by using a combination of the two or a dynamically determined execution platform. Such a system is described in US Patent Publication No. US 2018/0293323 entitled "System and Method for Smart Interaction Between Website Components" published 11 Oct. 2018 and assigned to the common assignee of the present invention and incorporated herein by reference.

Typical site creation may be based on a number of models, including a visual editing model (in which the user edits a previously created site) and an automatic site generation model or a combination thereof as illustrated in FIG. 1 to which reference is now made and is described in U.S. Pat. No. 10,073,923 entitled "System and Method for the Creation and Update of Hierarchical Websites Based on Collected Business Knowledge" granted 11 Sep. 2018 and assigned to the common assignee of the present invention and incorporated herein by reference.

FIG. 1 illustrates a system 100 that comprises a typical website building system 5 in communication with client systems operated by WBS vendor staff 61, a site designer 62 (i.e. a user), a site user 63 (i.e. user of user) and with external systems 70. Website building system 5 may further comprise a WBS (website building system) site manager 10, an object marketplace 15, a WBS RT (runtime) server 20, a WBS (website building system) editor 30, a site generation system 40 and a WBS content management system (CMS) 50. It will be appreciated that the elements of FIG. 1 may function as described in U.S. Pat. No. 10,073,923.

In the visual editing model, the user (designer) edits a site based on one or more website templates. The website building system provider may provide multiple site (or other) templates, with each template possibly including a complete sample web site, a web site section, a single page or a section of a page. Users may have the option to start with an empty site (essentially a "blank page" template) but would typically start with an actual site template.

The website building system provider may provide site templates ranging from the very generic (e.g. mobile site, e-store) through the more specific (e.g. law office, restaurant, florist) to the highly specific ones (e.g. a commercial real-estate law office or a Spanish tapas restaurant). Such templates are typically stored in a repository accessible to users of the website building system and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the website building system.

Thus, the user's first experience when creating a site using a website building system visual editor may typically be that the user chooses a template (e.g. according to style or industry type/sub-type), possibly a blank template and then he edits the template in the visual editor including the editing of content, logic, layout and attributes. Such editing may include (in particular) adapting the template and its elements to the details of the user's business. The user may then publish the modified site.

Under the site generation model, the website building system generates an initial site for the user, based on a selected template, possibly modified by filling-in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g. a generic product page) may appear multiple times, with each instance displaying the details of a different instance of an underlying entity (e.g. different products offered in the site). Such multiple instances may be manually specified (e.g. the details of different persons in the company's management team) or dynamically derived from an external database (e.g. product details from the "products on sale" database). Such an arrangement is often known as a "repeater".

The template may also include fields. For example, the website building system may allow the template designer to specify fields (also known as "placeholders") for the insertion of values inside the templates, such as {CompanyName}, {ProductName}, {ProductPrice} etc. The user may also specify the values for the fields defined in the template selected for the website.

The website building system may allow the user to enter simple or complex values (e.g. text and images), as well as additional (non-field) information such as selection of included pages or web site areas, colors, style information, links, formatting options, website display options, decoration elements (such as boarders and backgrounds) etc.

The website building system may also allow the user to enter some of this additional information before selecting a template, and use this information to help in selecting a template (e.g. by narrowing the set of proposed templates). For example, the user may select a certain generic color scheme (e.g. pastel colors) or style (e.g. business/formal), and the system may then use this selection to narrow the set of proposed templates.

The system may also display a series of views or questionnaires to allow the user to enter values or selections (for both the defined fields and the additional information above). The system may further create a connection (or binding) between a multiple-instance element of the template (as described herein above) and an internal or external database which provides the data instances used to generate the displayed instances.

Once a template has been selected and its fields and additional information have been specified (e.g. through the questionnaires or through binding to data sources), the website building system may generate the website containing the combined information. The user may then publish the site (through the website building system or otherwise).

A website building system may perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g. distinguishing between real-estate lawyers and personal injury lawyers).

The system may also gather external information from other sites, both internal and external to the system. Such information may affect, for example, the selection of offered questionnaires and layout elements, proposed defaults etc. Such information may also be typically be collected on a statistical or summary basis, in order not to expose information belonging to any single user, and protect users' privacy, anonymity and legal rights (such as copyrights). Such information may be located based on information provided by the user which may be direct (e.g. an existing website address) or indirect (a business name and geographical address which can be used to locate information about the business).

The gathered information is analyzed and arranged into a repository of content elements which are then mapped onto layout elements which present the content from the content elements and combines the layout elements to form the site. The layout element mapping, selection and combination process may be fully automatic or semi-automatic (i.e. including user interaction).

To support the above mentioned functionality above, a website building system will typically maintain a series of repositories, stored over one or more servers or server farms. Such repositories may typically include a user information/profile repository, a WBS (website building system) component repository, a WBS site repository, a Business Intelligence (BI) repository, an editing history repository, a third party application store repository, etc. The system may also include site/content creation related repositories such as a questionnaire type repository, a content element type repository, a layout element type repository, a design kit repository, a filled questionnaires repository, a content element repository, a layout element repository, a rules repository, a family/industry repository etc.

SUMMARY OF THE PRESENT INVENTION

There is provided in accordance with a preferred embodiment of the present invention, a tool for a website building system. The tool includes a database storing a plurality of text options, each text option formed of a hierarchical data structure (HDS) associated with a field role, the text option based on information gathered from the website building system and from sources external to the website building system, each HDS having nodes and sub-trees representing field content, text paragraphs and sentences; a role determiner to receive and determine a field role for an editable text field of a website, the website being at least one of: edited and generated with the web site building system; an analysis engine to make at least one text option recommendation from the database for the field role; an HDS editor to enable a user to select one recommended text option for the text field and to enable editing a local instance of an HDS of the text option including at least editing nodes and sub-trees of the local instance of the HDS; and a text generator to linearize the local instance and to generate the text for the text field for at least one of: a site generation system and an editor of the web site building system.

Moreover, in accordance with a preferred embodiment of the present invention, the analysis engine analyzes the information and makes change recommendations regarding the structure and content of the HDSs, field roles and rules, where the analysis is based on rules.

Further, in accordance with a preferred embodiment of the present invention, the rules are pre-determined.

Still further, in accordance with a preferred embodiment of the present invention, the tool also includes an HDS/rule handler to manage modifications to at least one entity, the modifications are from the HDS editor and from the text option recommendation and the change recommendations from the analysis engine, where the at least one entity is one of: a role, a rule, a node and a sub tree; and a data gatherer to gather the information.

Additionally, in accordance with a preferred embodiment of the present invention, the tool includes at least one of: an HDS SEO (search engine optimization) builder to generate SEO specific SEO information based on the generated text and to provide SEO data for the data gatherer; and a text kit interface to provide text kit extraction and kit re-integration capabilities for services external to the website building system.

Moreover, in accordance with a preferred embodiment of the present invention, the tool further includes an HDS/rule coordinator to coordinate between the role determiner, the analysis engine, the HDS editor, the text generator, the database; the HDS/rule handler, the data gatherer, the HDS SEO builder and the text kit interface.

Further, in accordance with a preferred embodiment of the present invention, the tool includes a visual editor coordinator to coordinate editing sessions between the HDS editor and the editor of the website building system.

Still further, in accordance with a preferred embodiment of the present invention, the analysis engine includes at least one of: an AI (artificial intelligence)/ML (machine learning) engine to analyze the information and to make the at least one text option recommendation and the change recommendations using artificial intelligence and machine learning techniques; a NLP (natural language processor) engine to analyze the information and to make the at least one text option recommendation and the change recommendations using natural language processing techniques; and a rule engine to determine the functionality of the HDS/rule handler regarding the entities according to the rules.

Additionally, in accordance with a preferred embodiment of the present invention, the HDS editor includes an HDS creator/editor to create and edit a basic HDS definition; an HDS instance creator to create and edit an HDS instance from the basic hierarchical data structure definition; a role creator/editor to create and edit initial role assignments for the basic HDS definition and a rule creator/editor to create and edit the rules.

Moreover, in accordance with a preferred embodiment of the present invention, the HDS/rule handler includes an orderer to generally order the at least one entity; a deleter to generally delete the at least one entity; a creator to generally create the at least one entity; a filterer to generally filter the at least one entity; a ranker to generally rank the at least one entity; a diversifier to diversify the at least one entity; a node adapter to apply changes to the HDS and a rule adapter to apply changes to the rules.

Further, in accordance with a preferred embodiment of the present invention, the data gatherer includes at least one of: an internal data gatherer to gather the information from within the web site building system; an external data gatherer to gather the information from resources external to the web site building system and a crowd source data gatherer to gather crowd source information to collect crowd source information to test an HDS.

Still further, in accordance with a preferred embodiment of the present invention, the text field is at least part of one of: a layout element, a layout group and a preset page section.

Additionally, in accordance with a preferred embodiment of the present invention, the generated text includes placeholder text from at least one of the site generation system, the data gatherer, the database and a user of the web site building system.

Moreover, in accordance with a preferred embodiment of the present invention, the database stores a field role association, HDS definitions and HDS local instances for each HDS.

Further, in accordance with a preferred embodiment of the present invention, the nodes and the sub-tree include at least one of: an option selection node, a sequence of nodes and an end node.

Still further, in accordance with a preferred embodiment of the present invention, the end node includes embedded objects having non-text data.

Additionally, in accordance with a preferred embodiment of the present invention, the HDS editor preserves context during the editing for the HDS.

Moreover, in accordance with a preferred embodiment of the present invention, the at least one text option recommendation and the change recommendations are based on hints from the web site building system.

Further, in accordance with a preferred embodiment of the present invention, the tool provides hints to the website building system based on at least one of: the analysis engine and user activity for the website building system.

There is provided in accordance with a preferred embodiment of the present invention, a method for a website building system. The method includes storing a plurality of text options, each text option formed of a hierarchical data structure (HDS) associated with a field role, the text option based on information gathered from the website building system and from sources external to the website building system, each HDS having nodes and sub-trees representing field content, text paragraphs and sentences; receiving and determining a field role for an editable text field of a website, the website being at least one of: edited and generated with the website building system; using an analysis engine to make at least one text option recommendation from the database for the field role; enabling a user to select one recommended text option for the text field and enabling editing of a local instance of an HDS of the text option including at least editing nodes and sub-trees of the local instance of the HDS and linearizing the local instance and generating the text for the text field for at least one of: a site generation system and an editor of the website building system.

Moreover, in accordance with a preferred embodiment of the present invention, the method includes using the analysis engine to analyze the information and to make change recommendations regarding the structure and content of the HDS s, field roles and rules, where the analysis is based on rules.

Further, in accordance with a preferred embodiment of the present invention, the rules are pre-determined.

Still further, in accordance with a preferred embodiment of the present invention; the method includes managing modifications to at least one entity, the modifications from the enabling a user to select and the enabling editing, and from the text option recommendation and the change recommendations from the using an analysis engine, where the at least one entity is one of: a role, a rule, a node and a sub tree; and gathering the information.

Still further, in accordance with a preferred embodiment of the present invention; the method includes at least one of: generating SEO (search engine optimization) specific SEO information based on the generating the text and providing SEO data for the gathering the information; and providing text kit extraction and kit re-integration capabilities for services external to the web site building system.

Additionally, in accordance with a preferred embodiment of the present invention; the method includes coordinating between the receiving and determining a field role, the using an analysis engine, the enabling a user to select and the enabling editing, the linearizing the local instance and generating the text, the storing, the managing modifications, the gathering the information, the generating SEO specific SEO information and the providing text kit extraction and kit re-integration.

Additionally, in accordance with a preferred embodiment of the present invention, the method includes coordinating editing sessions between the enabling a user to select and the enabling editing and the editor of the website building system.

Moreover, in accordance with a preferred embodiment of the present invention, the using an analysis engine includes at least one of: analyzing the information and making the at least one text option recommendation and the change recommendations using artificial intelligence and machine learning techniques; analyzing the information and making the at least one text option recommendation and the change recommendations using natural language processing techniques; and determining the functionality of the managing modifications regarding the entities according to the rules.

Further, in accordance with a preferred embodiment of the present invention, the enabling a user to select and the enabling editing includes creating and editing a basic HDS definition; creating and editing an HDS instance from the basic HDS definition; creating and editing initial role assignments for the basic HDS; and creating and editing the pre-determined rules.

Still further, in accordance with a preferred embodiment of the present invention, the managing modifications includes ordering the at least one entity; deleting the at least one entity; creating the at least one entity; filtering the at least one entity; ranking the at least one entity; diversifying the at least one entity; applying changes to the HDS; and applying changes to the rules.

Additionally, in accordance with a preferred embodiment of the present invention, the gathering the information includes at least one of: gathering the information from within the website building system; gathering the information from resources external to the website building system; and gathering crowd source information to collect crowd source information to test an HDS.

Moreover, in accordance with a preferred embodiment of the present invention, the text field is at least part of one of: a layout element, a layout group and a preset page section.

Further, in accordance with a preferred embodiment of the present invention, the generated text includes placeholder text from at least one of the site generation system, the gathering the information, the database and a user of the website building system.

Still further, in accordance with a preferred embodiment of the present invention, the storing stores a field role association, HDS definitions and HDS local instances for each HDS.

Additionally, in accordance with a preferred embodiment of the present invention, the nodes and the sub-tree include at least one of: an option selection node, a sequence of nodes and an end node.

Moreover, in accordance with a preferred embodiment of the present invention, the end node includes embedded objects having non-text data.

Further, in accordance with a preferred embodiment of the present invention, the enabling a user to select and the enabling editing preserves context during the editing for the HDS.

Still further, in accordance with a preferred embodiment of the present invention, the at least one text option recommendation and the change recommendations are based on hints from the web site building system.

Additionally, in accordance with a preferred embodiment of the present invention, the method includes providing hints to the website building system based on at least one of: the using an analysis engine and user activity for the website building system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 12A, 12B and 12C are schematic illustrations of example user interfaces for the HDS editor of FIG. 3; constructed and operative in accordance with the present invention.

Figure 1:
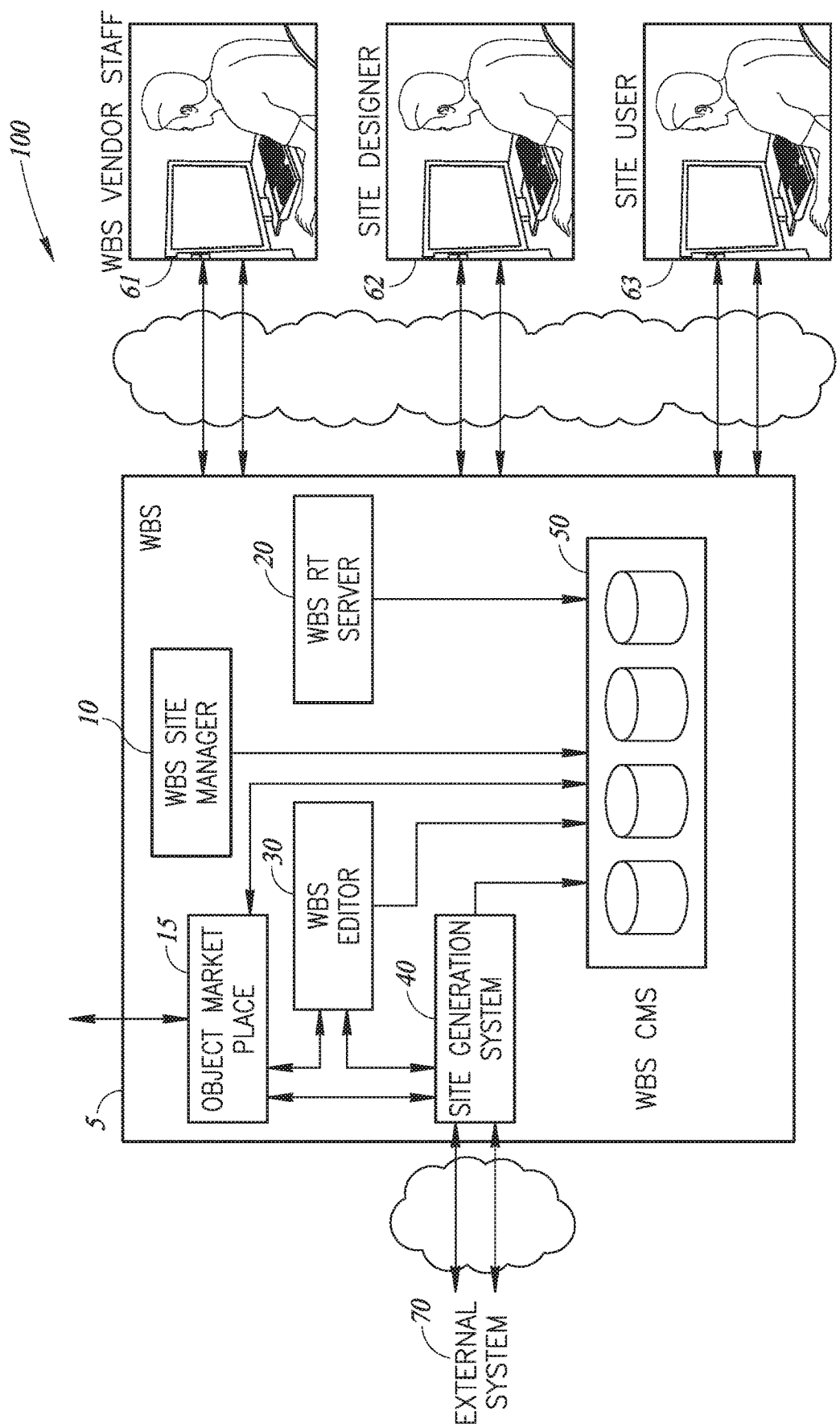
FIG. 1 is a schematic illustration of a system for the creation and update of hierarchical websites.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that existing website building systems do not support the user in the creation of the actual content of each text component, and do not provide sufficient guidance and recommendations as to what the best practices are in the creation of website content for specific purposes. Typically just the empty component is provided without text or with place holder text only. For non-text content (such as images and video), there are often numerous available repositories (from which the user can select), or an easy way to generate such content (e.g. using a camera).

It will be appreciated that for text content, simple pre-written text is often insufficient (and far too generic). There is also no easy way to quickly view and select among large quantities of standard text, and starting with a "blank screen" is extremely difficult for most users (a phenomenon known as "writer's block"). Thus, most website building systems may simply fill text components with meaningless sample text (such as the well-known "Lorem Ipsum"). Applicant has also further realized that users often do not publish their sites at all because they cannot fill in the required text elements, or are not happy with the text they have written.

Solutions for Natural Language Generation (NLG) (such as ones using templates, rule engines or machine learning) exist in the art. Existing NLG systems are typically aimed at providing automated generation of stand-alone text content, such as form letters, news articles, weather forecasts or chat-bot responses. Such solutions are typically non-interactive and less suitable for use in website creation.

Applicant has also realized that the above mentioned inadequacies may be overcome by a system that integrates interactive generation and structured editing of text with the web site building system internal data structure and incorporating it with the information gathered as part of the automated site generation process as described above (including the user's own data and that of other websites). The text generation process is integrated with an interactive alternative text selection process that includes data gathering, an analysis engine, a rule repository and follow-up text component editing as described in more detail herein below. Such a process may be particularly useful within the site creation and editing process of a website building system.

The system encompasses a website building system based text content generator which integrates a combination of the following: a hierarchical data structure (HDS) describing a text element alternatives hierarchy (for a given field role as discussed in more detail herein below), an information gathering element, supporting gathering of information including both information related to the current user and crowd-sourced information related to other users, a rule set and analysis engine for text handling rules, possibly based on an AI/ML engine and natural language processing, providing text options filtering, ranking, diversification, ordering and adaptation and an interactive hierarchical data structure editor which may support interactive text selection and ordering based on the hierarchical data structure, the analysis engine and the gathered information in order to create text content for the website building system sites. It will be appreciated that a hierarchical data structure may also be considered as having nodes and sub-trees describing field content, text paragraphs and sentences as discussed in more detail herein below.

Thus, the final text is a combination of the hierarchical data structure pre-defined content, additional system adaptations, the manipulation and selection by the user, information filled into placeholders and free text based on writing or editing by the user together with user information and crowdsourcing data.

Figure 2:
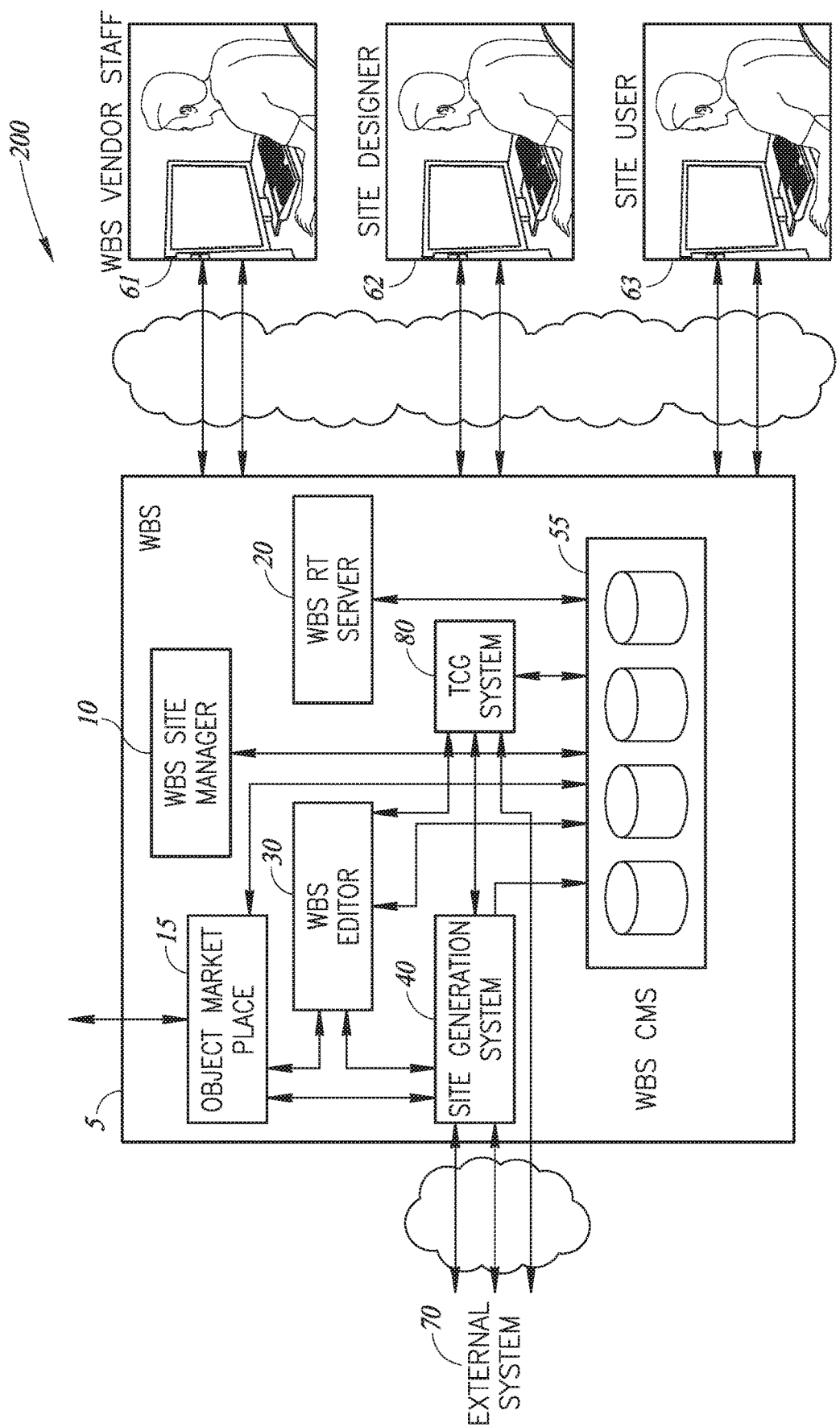
FIG. 2 is a schematic illustration of a system for interactive generation and structure editing of text content for a web site building system; constructed and operative in accordance with the present invention.

Reference is now made to FIG. 2 which illustrates a system 200 for the interactive generation and structure editing of text content for a website building system according to an embodiment of the present invention. It will be appreciated that the text generation process is integrated with an interactive alternative selection process, with an underlying data gathering sub-system, an analysis engine and rule repository and with follow up text component editing as described in more detail herein below.

It will be appreciated that system 200 as described herein below is aimed at website building together with text generation. However, in an alternative embodiment, system 200 may also use the same technique for other object types, such as elements inside a text stream (e.g. text flow containing embedded images) or for other types of composite objects which can be constructed from sections (e.g. a background music play-list component consisting of a sequence of music tracks).

System 200 may comprise the elements of system 100 as described in U.S. Pat. No. 10,073,923 in conjunction with a TCG (text content generator) system 80. It will be appreciated that in a typical embodiment, the constructed site consists of sections (such as layout elements or partial page sections) serving specific purposes and consisting of a similar composition of objects (e.g. a 5-tuple consisting of title/sub-title/text paragraph/button/media [image]). Some sections may contain multiple such sets, such as a section describing a list which may show multiple such 5-tuples.

For each unique text field (e.g. a section/business type combination), WBS vendor staff 61 may define a role and a matching set of text content options defined in a specific hierarchical data structure (e.g. for the title/sub-title/text paragraph/button). All of these text elements may include placeholders which are filled from information gathered by site generation system 40.

It will be appreciated that system 200 may also provide integration with external systems 70 which may include external text-related services such as text writing, editing, adaptation, review and translation services. This could be with traditional off-line services (such as translation agencies), or with Internet-based service providers (such as FIVERR from fiverr.com).

Figure 3:
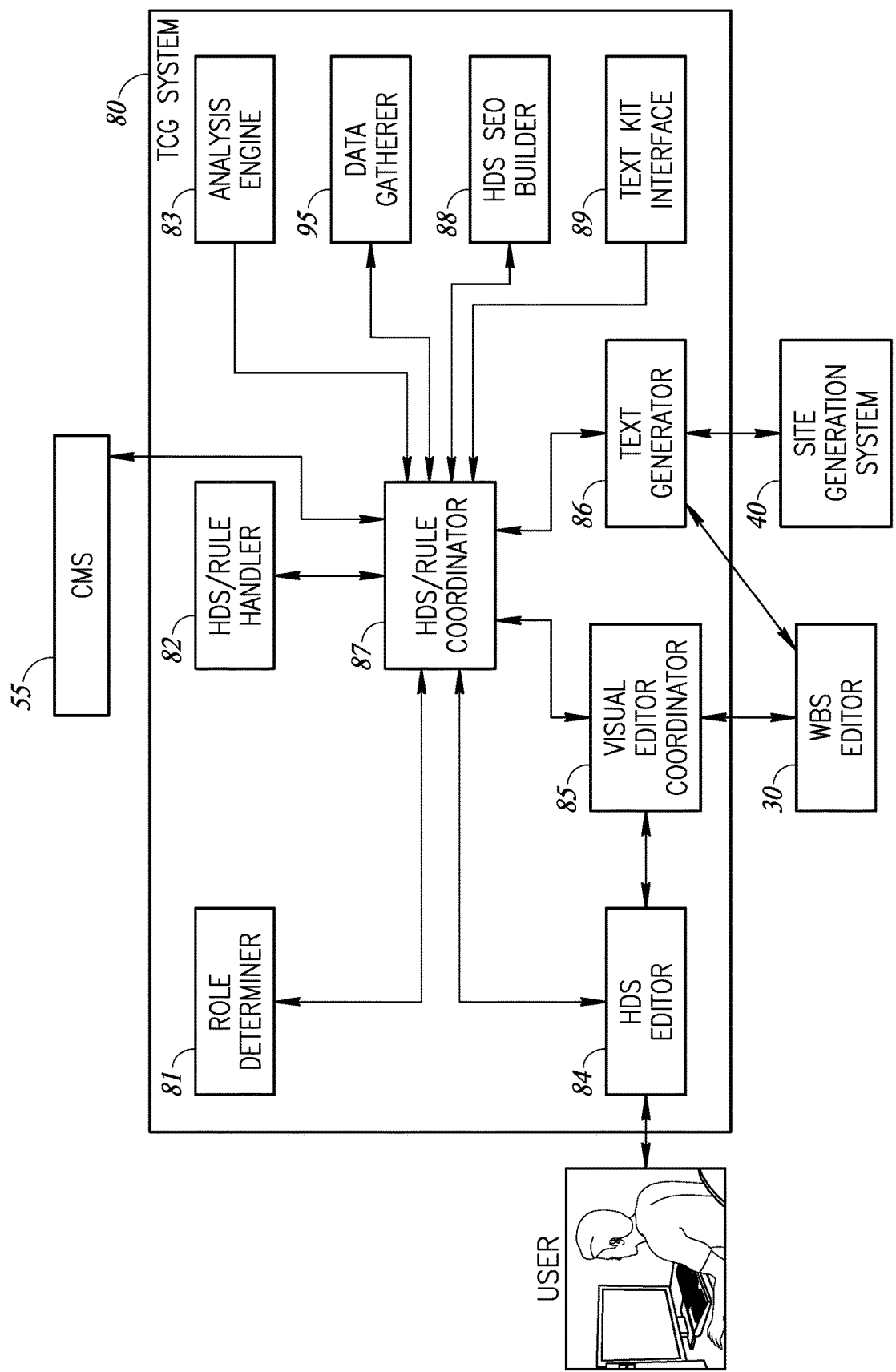
FIG. 3 is a schematic illustration of the text content generation system of FIG. 2; constructed and operative in accordance with the present invention.

Reference is now made to FIG. 3 which illustrates the elements of TCG system 80. TCG system 80 may comprise a role determiner 81, an HDS (hierarchical data structure)/rule handler 82, an analysis engine 83, an HDS editor 84, a visual editor coordinator 85, a text generator 86, an HDS/rule coordinator 87, an HDS SEO builder 88, a text kit interface 89 and a data gatherer 95.

Role determiner 81 may determine a role for a text field, HDS/rule handler 82 may be responsible for the management of roles, hierarchical data structures and rules including their manipulations (handling definitions and instances) and the updating of their repositories in CMS 55 accordingly. HDS/rule handler 82 may handle both the saved (CMS 55) HDS/rule data structure as well as the in-memory ones. Analysis engine 83 may provide services related to the analysis of information (based on machine learning, artificial intelligence, natural language processing or pre-defined rules) on order to provide recommendations for text options to present to a user and change recommendations to roles, rules and hierarchical data structures. Visual editor coordinator 85 may coordinate between HDS editor 84 and WBS editor 30. HDS/rule coordinator 87 may coordinate between all of the above mentioned elements and between role determiner 81, HDS/rule handler 82, analysis engine 83 and data gatherer 95 and the repositories in CMS 55 exchanging (for example) hierarchical data structure definitions and definitions, rule and artificial intelligence information for analysis engine 83 etc. Text generator 86 may generate the finalized text to be used for further editing and site generation. HDS SEO builder 88 may further use information available in the hierarchical data structure instances to generate specific SEO-related information, text kit interface 89 may provide text kit extraction and kit re-integration capabilities and data gatherer 95 may gather information for use by analysis engine 83. The functionality of these elements is discussed in more detail herein below.

Figure 4:
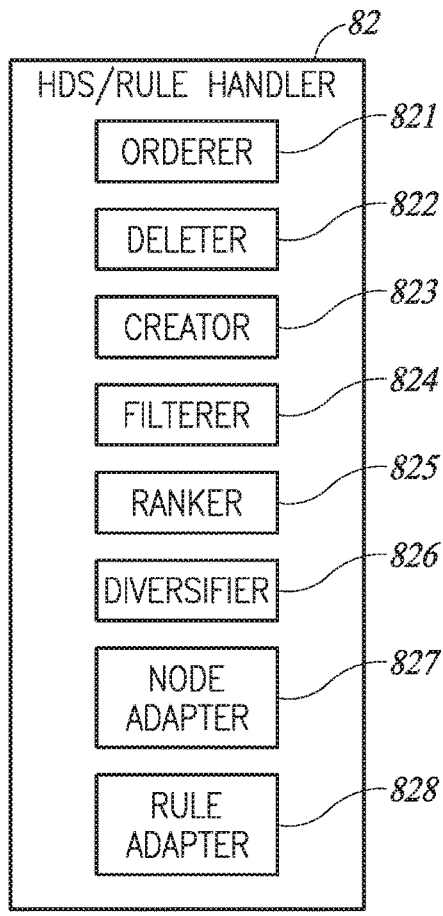
FIG. 4 is a schematic illustration of the elements of the HDS (hierarchical data structure)/rule handler of FIG. 3, constructed and operative in accordance with the present invention.

Reference is now made to FIG. 4 which shows the elements of HDS/rule handler 82. HDS/rule handler 82 may comprise an orderer 821, a deleter 822, a creator 823, a filterer 824, a ranker 825, a diversifier 826, a node adapter 827 and a rule adapter 828. The functionality of these elements is discussed in more detail herein below.

Figure 5:
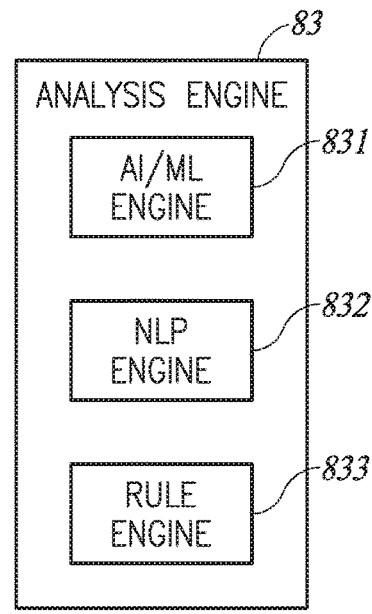
FIG. 5 is a schematic illustration of the elements of the analysis engine of FIG. 3, constructed and operative in accordance with the present invention.
Figure 6:
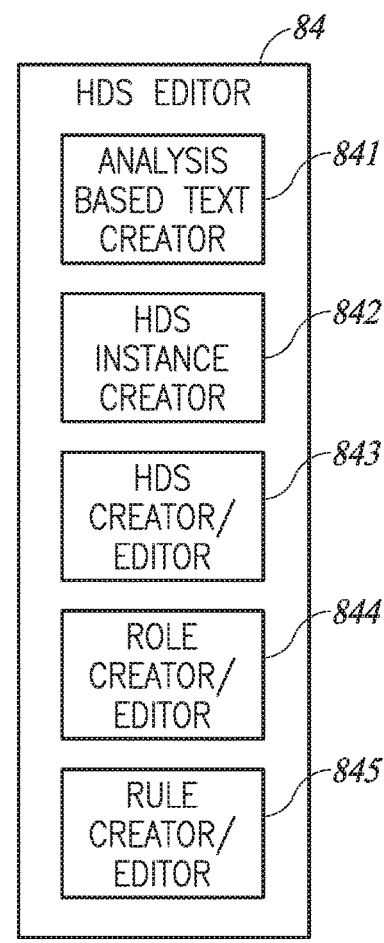
FIG. 6 is a schematic illustration of the elements of the HDS editor of FIG. 3, constructed and operative in accordance with the present invention.

Reference is now made to FIG. 5 which shows the elements of analysis engine 83. Analysis engine 83 may comprise an AI (artificial intelligence)/ML (machine learning) engine 831, an NLP (natural language processing) engine 832 and a rule engine 833. The functionality of these elements is discussed in more detail herein below. It will be appreciated that different embodiments of system 200 may only implement one or two of the elements of analysis engine 83. Reference is now made to FIG. 6 which shows the elements of HDS editor 84. HDS editor 84 may further comprise an analysis based text creator 841, an HDS instance creator 842, an HDS creator/editor 843, a role creator/editor 844 and a rule creator/editor 845. The functionality of these elements is discussed in more detail herein below.

It will be appreciated that HDS editor 84 may provide a unified editing environment for both the hierarchical data structure definition setup (e.g. by WBS vendor staff 61) and the hierarchical data structure local instance edit (e.g. by site designer 62). In an alternative embodiment, system 200 may provide a separate editing environment for each of the tasks, e.g. by splitting HDS editor 84 into separate definition editing (possibly integrating rule editing) and instance editing tools. It will be appreciated that this definition editing environment may use HDS creator/editor 843 to implement the basic hierarchical data structure definition creation, which may be manual or automatic or a combination of the two. Manual creation of hierarchical data structure definitions may be based (for example) on a visual editing environment which supports the creation of hierarchical data structures or of text variant tables (such as the "About us" example described herein below). Automatic creation may be based (for example) on an analysis of a substantial number of text samples for a given role in order to detect common structures and substructures and then arranging them in a suggested hierarchy of options which may be edited by HDS editor 84. Such text samples may be gathered using data gatherer 95 and the follow-up analysis may be made using analysis engine 83 (including NLP engine 832 in particular). It will also be appreciated that the described procedures for hierarchical data structure definition creation and editing may also be used to create a set of matching rules for the generated hierarchical data structure's application and behavior.

It will be appreciated that although hierarchical data structure definition editing (as described herein above) is typically reserved to WBS vendor staff 61, system 200 may make some or all of this functionality available to site designers 62. This is typically done in the context of the creation of a private variant of a hierarchical data structure definition which may be specific to the given field, page, web site, web site area or the specific user (for use within multiple sites). Such a private variant may implement an inheritance relationship with the original hierarchical data structure definition. System 200 may similarly allow the user to perform rule editing for local rule variations. Such a private variant may allow the user, for example, to add a private paragraph or sentence hierarchical data structure sub-hierarchy to a private variant of a specific hierarchical data structure offering, or to make other changes which better reflect the user's preferences. System 200 may also allow users to create full-scale hierarchical data structure definitions (possibly including private rules specific to them), which may also be transferable to other users or may be sold through object marketplace 15.

Figure 7:
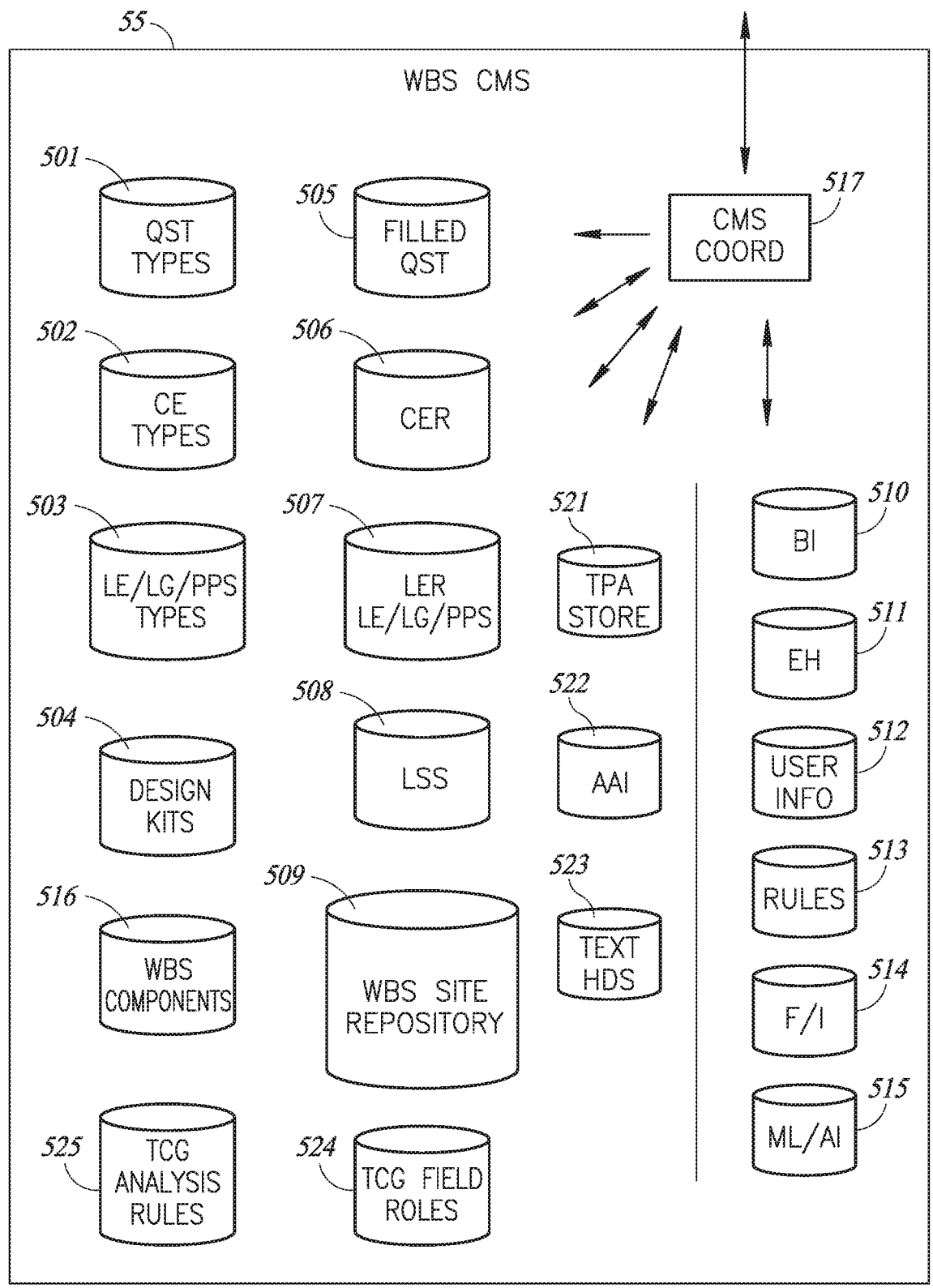
FIG. 7 is a schematic illustration of the various repositories of the content management system of FIG. 3; constructed and operative in accordance with the present invention.

Reference is now made to FIG. 7 which illustrates a typical grouping of the type of repositories that may held within the content management system of the pertinent website building system (CMS 55) as described herein above. It will be appreciated that in addition to the repositories of CMS 50 as described in U.S. Pat. No. 10,073,923, CMS 55 may also comprise a TPA (third party application) store 521, an AAI (Additional Administrative Information) repository 522, a text HDS repository 523, a TCG field role repository 524 and a TCG analysis rules repository 525. It will be appreciated that the various repositories of CMS 55 may all be used by WBS editor 30 and site generation system 40 during the website creation process.

Figure 8:
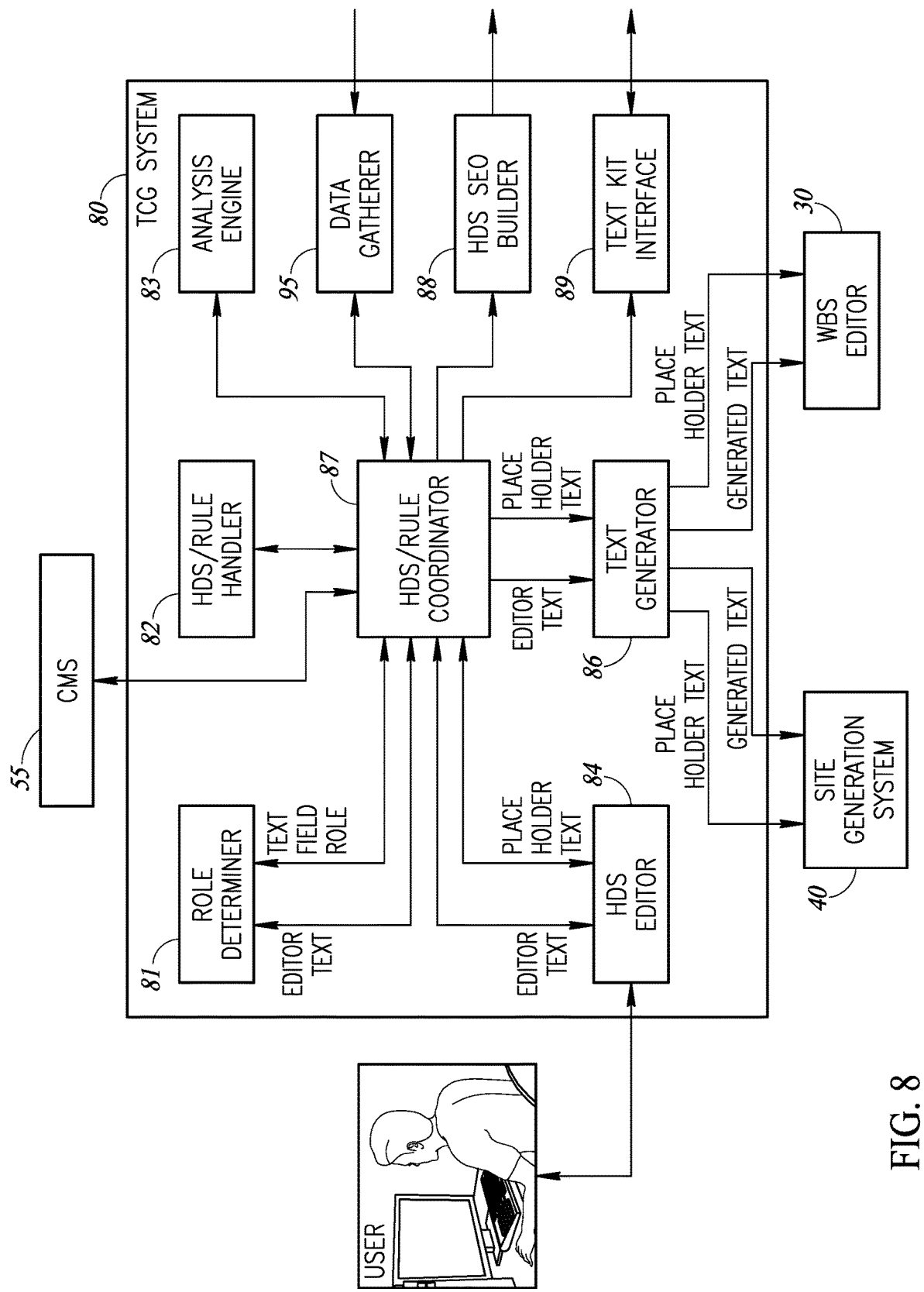
FIG. 8 is a schematic illustration of the workflow functionality of the system of FIG. 3 during an editing session; constructed and operative in accordance with the present invention.

Reference is now made to FIG. 8 which shows the functionality of TCG system 80 during an editing session. It will be appreciated that for a typical usage scenario, the user may invoke TCG system 80 while using a website building system either during site generation or a review process, or within WBS editor 30 (as described in more detail herein below). As discussed herein above, the user is typically a website designer 62. It will be appreciated that WBS vendor staff 61 may also use TCG system at runtime to (for example) edit a template. It will be further appreciated that a site user 63 may also use TCG system 80 if he has been awarded certain editing rights involving text creation or editing (such as users updating product descriptions text in an auction site).

It will be also appreciated that TCG system 80 may be invoked by WBS editor 30 and site generation system 40 during the website building process. In an alternative embodiment, TCG system 80 may be standalone and operate without an involving module.

The user may select a text field requiring text entry (via HDS editor 84) during (for example) a page editing session. Role determiner 81 may receive the field, determine its role (as described in more detail herein below) and forward it to analysis engine 83 which may retrieve one or more suggested hierarchical data structure definitions for the role.

Analysis engine 83 may send the suggested hierarchical data structure definitions to HDS/rule handler 82. HDS/rule handler 82 may then provide them to HDS editor 84 (which may present the recommended hierarchical data structure or text option to the user). The user may then edit the hierarchical data structure as required (via HDS editor 84). It will be appreciated that the editing may include changes to the hierarchical data structure definition itself (selecting branches, deleting elements, reordering nodes etc. as described in more detail herein below) as well as actual text editing. HDS instance creator 842 may create a hierarchical data structure instance from the hierarchical data structure definition (as discussed in more detail herein below). Field roles and field role associations may be saved in repositories 523 and 524.

It will be appreciated that the editing may also involve filling in placeholder text values. HDS editor 84 may consult with analysis engine 83 or directly with CMS 55 to provide guidelines on handling the text editing and the hierarchical data structure changes.

HDS editor 84 may send the hierarchical data structure instance to HDS/rule handler 82 which may send it to text generator 86 to generate a final text for the field (which may possibly include back-links or other associations with the underlying hierarchical data structure instance).

HDS/rule handler 82 may also record the resulting text and updated hierarchical data structure in CMS 55 (including updating EH (editing history) repository 511 and text HDS repository 523).

It will be further appreciated that placeholder text may come from multiple places including from the user himself (via HDS editor 84), CMS 55 or from site generation system 40 itself and therefore may bypass HDS/rule handler 82 straight to text generator 86.

It will also be appreciated that a re-edit of a text field (at a later stage in the editing process) may use a reduced workflow pattern since the text field already has a determined role and hierarchical data structure. This may be considered a maintenance workflow as opposed to a creation workflow.

Another workflow may be a setup workflow used by WBS vendor staff 61 when creating the initial hierarchical data structure specification, the initial role assignments and rules for use by analysis engine 83 (as described in more detail herein below) using role creator/editor 844, HDS creator/editor 843 and rule creator/editor 845 accordingly.

The updated text may also be used as part of SEO (search engine optimization) and may be sent to HDS SEO builder 88 as described in more detail herein below.

It will be appreciated that not all the elements of TCG system 80 may be activated during an editing session. For example, analysis engine 83 may be activated to select a role for a field (that require non hierarchical data structure manipulation) and HDS/rule handler 82 may be activated by visual editor coordinator 85 to adapt a hierarchical data structure to changes made by a user to the text during an WBS editor 30 text editing session (which does not involve analysis engine 83).

It will also be appreciated that roles for text fields (to be using during editing/runtime) may be set up via WBS vendor staff 61 (via role creator/editor 844), by user or by role determiner 81 through an analysis of website elements as described in more detail herein below. Hierarchical data structures may be setup via WBS vendor staff 61 (via HDS creator/editor 843) as well as rules for use by analysis engine 83 which are stored in TCG analysis rules repository 525.

Figure 9:
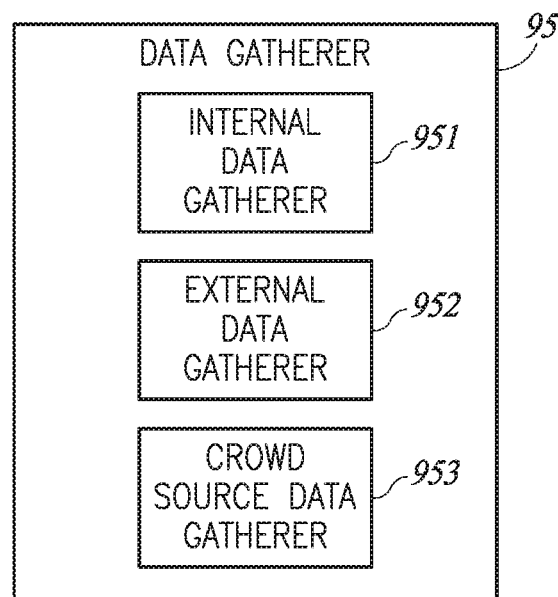
FIG. 9 is a schematic illustration of the elements of the data gatherer of FIG. 3; constructed and operative in accordance with the present invention.

Reference is now made to FIG. 9 which illustrates the elements of data gatherer 95. Data gatherer 95 may comprise an internal data gatherer 951 and an external data gatherer 952 to gather information from internal and external sources to the website building system (as described in more detail herein below in relation to analysis engine 83). Data gatherer 95 may further comprise a crowd source data gatherer 953 which may collect crowd source information to be used to support the test of a hierarchical data structure. The functionality of these elements is similar to the functionality of internal data gatherer 44, external gatherer 43 and crowd source data analyzer 423 as described in U.S. Pat. No. 10,073,923. It will be appreciated that although internal data gatherer 951, external data gatherer 952 and crowd source data analyzer 953 access the same data sources using similar browser and data extraction techniques, the gathered data is analyzed by analysis engine 83 as described in more detail herein below.

It will be appreciated that the user may also edit the generated text in WBS editor 30 as well as HDS editor 84. In this scenario, the user may interact with HDS editor 84 via visual editor coordinator 85 in order to create the final text. In an alternative embodiment, visual editor coordinator 85 may adapt hierarchical data structures directly from CMS 55 by bypassing HDS editor 84 to WBS editor 30. It will also be appreciated that the user may also return to HDS editor 84 in the future in order to benefit from structured editing of the text. Visual editor coordinator 85 may provide the required coordination and editing history tracking in order to maintain the integration between the text as freely edited in the WBS editor 30 and its structure hierarchical data structure-based representation.

In an alternative embodiment, TCG system 80 may be used outside of the website building system (e.g. in a standalone configuration, or while still being hosted on the website building system vendor servers). In this scenario, TCG system 80 may operate with a limited version of system 200 and may interact with the website building system for required information, either directly (e.g. online) or via information sent to it by the website building system. Alternatively, TCG system 80 may include some sub-elements of system 200 (such as elements of CMS 55 or of WBS editor 30). Such a configuration may be useful for large scale text creation or editing, e.g. by an external text creation/translation agency as described herein above.

TCG system 80 may also be used directly through its own dedicated UI, or be implemented (through an API or web service) which is used by or embedded in another system providing the required UI.

It will be appreciated that the following description focuses on the features relevant to system 200 and does not necessarily include all features available to a website building system. System 200 may also implement a subset of the described features, and not necessarily all described features.

The description below discusses applications created by website building systems and accessed by end-users as websites. It will be further appreciated that system 200 may be applied to other categories of on-line applications which are accessed using specific client software (proprietary or not). Such client software may run standalone or be activated from a browser (such as the Adobe Flash plug-in). End-users may access these web sites using client software on regular PC's (as illustrated in FIG. 2) but also on smart-phones, tablet computers and other desktop, mobile or wearable devices. Alternatively, system 200 may be applicable to systems which generate games, mobile applications, native applications or other application types as described in U.S. Pat. No. 9,996,566 entitled "Visual Design System for Generating a Visual Data Structure Associated with a Semantic Composition Based on a Hierarchy of Components" granted 12 Jun. 2018 and assigned to the common assignee of the present invention and incorporated herein by reference.

In particular, system 200 may be applicable to visual design systems which may include visual design systems used to create stand-alone applications such as desktop application development environments (e.g. for use with personal computers); mobile application development environments (e.g. for use with Smartphones and tablets); client-server application development environments and non-browser web application development environments (for use with environments such as Adobe's flash player); plug-in development environments, systems which create plug-ins and other add-on elements for other systems (web browsers or otherwise) and shop-builders i.e. systems which focus on the creation of e-shops (or e-commerce sites).

Furthermore, system 200 may be used to generate text content which is not a regular text component inside an application. Example use may include text that is provided as part of a UI or as part of a communication message, such as the actionable widget cards described in US Patent Publication No. 2018/0174229 entitled "Actionable Widget Cards" published 21 Jun. 2018 and assigned to the common assignee of the present invention and incorporated herein by reference. These are cards which provide information/recommendations to the user (such as a recommended blog post text for a recently released product or other marketing material) which may be sent to the user via multiple communication channels (such as e-mail, chat, application message queue etc.). Another example would be text to be posted to social networks (such as Facebook and Twitter), in this scenario system 200 may adapt the text or provide appropriate hierarchical data structures based on the desired delivery channel (e.g. provide a brief text for Twitter and a longer one for a blog post). Yet another example is text to be integrated into a non-application environment/content, such as text to be embedded into video (e.g. as captions or displayed text) or audio content (e.g. via text-to-speech). System 200 may also be useful for the creation of printed material, as part of a page design or layout system, again possibly providing text alternatives suitable for the provided space or other considerations related to the printed creation design.

The discussion below also focuses on websites hosted by a website building system provider, and in particular for websites providing an on-line presence for small and medium businesses such as hotels, law offices and restaurants. Such businesses may often be classified according to their family and industry, as discussed in U.S. Pat. No. 10,073,923. The family defines the general type or category of the enterprise such as a school, clinic, law office etc. The industry is a specific industry or knowledge domain type. For example, for the school family, the system may support multiple industries (i.e. school types) such as art, engineering, and music schools. It will be appreciated that system 200 may also be applied to additional types of websites and other non-web digital creations as discussed herein above.

As discussed herein above, system 200 supports the user in interactively creating text content for a text field in the generated web site. Such a field may typically have a role associated with it, related to the field and its function within the page or page section containing it. Roles may or may not be unique within the site, page or page section. For example, an "About Us" page describing a business may have one "Our Company" text field, one "main services" text field, and multiple "team member" text fields.

The role of the text field may be determined in a number of ways. One way is for the field's role to be predefined. For example, the field may be a part of a template (e.g. site, page or page section level) which defines roles for some or all of its text fields. Role determiner 81 may assist WBS vendor staff 61 or website designers in assigning such predefined roles to relevant text fields.

In the context of a site generation system such as the one described in U.S. Pat. No. 10,073,923 the text field may be a part of a layout element, a layout group, or preset page sections used to construct the given page by the site generation system. Role determiner 81 may assign a role to the underlying content element with which the given layout element/layout group/preset page sections is matched, or (directly) to the layout element/layout group/preset page sections itself. Such assignment may be made at the HDS definition level (for vendor staff 61) or at the HDS instance level (for user 62).

Role determiner 81 may also provide the user via HDS editor 84 list of possible roles from which the user may select an appropriate role (for example at a setup stage). It will be appreciated that system 200 may further provide a search engine for role selection (as the number of potential roles may be very large), using operations typically provided by search engines (such as similar word search).

Role determiner 81 may also determine a set of possible roles based on additional information available to the website building system or analysis performed by analysis engine 83 and rank them (as discussed in more detail herein below). It will be appreciated that such information and analysis by analysis engine 83 may include, for example pre-defined or user-specified information about the containing page or page section (e.g. for text fields inside a "about us" page only offer roles such as "company description", "our team", etc.). It may also include information entered by the user for current or other fields (such as roles selected for previous text fields). Analysis engine 83 may also use information from previous interactions with the current or other users and information gathered from the same and other users, possibly evaluated according to the user's profile information (e.g. real estate lawyers in the US typically use a role such as "areas of expertise", . . . in their site front page).

The role determination analysis performed by analysis engine 83 may also include other types of analysis of the current or other site areas, possibly including analysis of site's layout, components, component content, geometric or other component relationships as well as the site editing history. For example, a user has created 3 sets of [image+ text], and has assigned the role "manager's biography" to each of the 3 text fields. The user then creates a 4th such [image+text] set which is geometrically aligned with the previous 3 sets. In this case, it is very likely that the 4th text field's role is "manager's biography" as well.

In another example, role determiner 81 may determine that a text field is related to a nearby image field, and that the display image is a person's face. This could be based (for example) on image metadata/name/description or on image content analysis. In such a scenario, it is reasonable to expect that the text field's role will be related to the person's details, information or biography.

It will also be appreciated that role determiner 81 may use available information (such as the gathered information described herein above) to make an automatic field role determination without requiring any additional user interaction.

Alternatively, role determiner 81 may also perform user-input based analysis. One particular type of analysis is having the user type (into the field) a free-form example of the desired type of content. Role determiner 81 may then analyze this content using NLP engine 832 (as discussed in more detail below in relation to analysis engine 83). NLP engine 832 may recognize the specific field role (if this is required) and possibly additional information about the required content in order to provide the user with a professionally written content variant (as discussed in more detail herein below) serving the same purpose.

It will be appreciated that the user-entered text is not used as a regular search key (i.e., as is used in search engines). Rather, role determiner 81 may instruct NLP engine 832 to extract the user's intent and then search HDS repository 523 for current or related roles which include text alternatives serving the same intent, even if the alternatives use completely different or unrelated text to that provided by the user.

It will also be appreciated that the methods for analysis used by role determiner 81 such as the ones described above may be similar to the functionality of NLP engine 4211 in U.S. Pat. No. 10,073,923 and the various types of geometric and semantic analyses as described concerning POS locator 250 in US Patent Publication No. 2015/0074516 now issued as U.S. Pat. No. 10,176,154 dated 8 Jan. 2019 entitled "System and Method for Automated Conversion of Interactive Sites and Applications to Support Mobile and Other Display Environments" published 12 Mar. 2015 and assigned to the common assignee of the present invention and incorporated herein by reference. The analyses described herein above may also be used by HDS/rule handler 82 to rank the list of hierarchical data structures and hierarchical data structure nodes/sub-trees displayed to the user for selection, as well as the order in which they are presented (i.e. their "search rank").

As discussed herein above, once a text field's role is known, the knowledge may be used by TCG system 80 to create content for the particular field. This may be done by retrieving (from HDS repository 523) appropriate hierarchical data structures associated with the role as determined by analysis engine 83. System 200 may allow multiple hierarchical data structures to be associated with a given role, using additional gathered information (as described above for role determiner 81 and possibly user choice) to select the hierarchical data structures to use.

Figure 10:
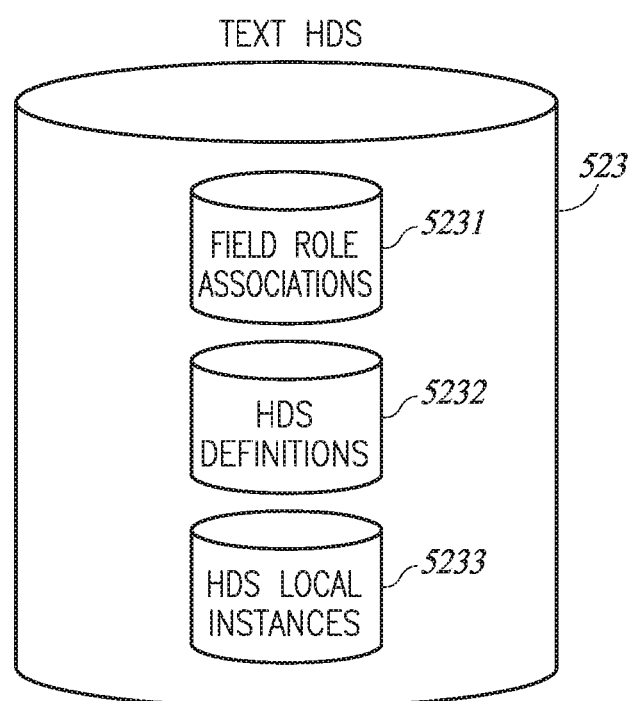
FIG. 10 is a schematic illustration of the structure of text HDS repository of FIG. 7; constructed and operative in accordance with the present invention.

Reference is now made to FIG. 10 which illustrates the sub elements of HDS repository 523. For each hierarchical data structure, HDS repository 523 may store its field role associations 5231, its HDS definitions 5232 and its HDS local instances 5233. It will be appreciated that a single role may have multiple hierarchical data structure definitions and that HDS local instances 5233 may include editing context information. Thus HDS repository 523 may store the current choices and modifications made by the user including those not appearing in the current display but kept in case the user returns to them.

It will be appreciated that the hierarchical data structure describes the various options for elements of the generated text which are placed in the text field, including additional attributes providing information needed for the various analysis and selection elements above. The hierarchy levels may be likened to a node structure, with the nodes having different types. For example the nodes may consist of an "option selection node" (single node), a sibling "ordered set" of nodes or end-nodes. For a "select one of" node, the user has to select one of the offered alternative sub-nodes (determined and ranked as described in more detail herein below).

An "ordered set" node is a sub-tree consisting of an ordered sequence of given sub-nodes. The user may perform various editing operations on this sequence, such as changing sub-node order or deleting sub-nodes.

Reference is now made back to FIG. 4 which illustrates the elements of HDS/rule handler 82. HDS/rule handler 82 may be used to modify the hierarchical data structures and adapt rules as described in more detail herein below. It will be appreciated that when creating a first version for the user to edit, HDS/rule handler 82 may implement any ordering/ranking/diversifying based on the recommendation made by analysis engine 83 (for example selecting which nodes to show and in what order at each displayed hierarchical data structure level).

During an editing session, HDS/rule handler 82 may provide the back-end handling of the displayed hierarchical data structure which may include consulting with analysis engine 83 for in-editing recommendations. In this scenario, HDS editor 84 may be the front-end (though it may run on the client, the server or both) and HDS/rule handler 82 may provide the interface to the hierarchical data structures.

As discussed herein above, modifications to hierarchical data structures may be made using system-initiated analysis, e.g. analyzing a common change made by multiple users and inferring that a permanent change should be made to the hierarchical data structure definition. It will be appreciated that this could be fully system initiated (e.g. a background process performed at a given frequency) or triggered by specific user activity (e.g. when the N'th user makes a similar change).

HDS/rule handler 82 may also handle hierarchical data structure changes initiated by visual editor coordinator 85 based on "regular" editing of the (TCG system 80 generated) text in a text field which affects the hierarchical data structure of the text field.

As discussed herein above HDS/rule handler 82 may handle manipulations and modifications to entities such as roles, rules, nodes, sub-trees, results from analysis engine 83 etc. It will be appreciated that the functionality of HDS/rule handler 82 may be applied depending on the handled entity in question i.e. a role, a hierarchical data structure or a node itself.

Orderer 821 may generally order entities, deleter 822 may generally delete entities, creator 823 may create new entities, filterer 824 may generally filter entities, ranker 825 may generally rank entities, diversifier 826 may diversify entities, node adapter 827 may adapt changes to nodes and rule adapter 828 may adapt changes to the text content generation analysis rules in TCG analysis rules repository 525.

It will also be appreciated that orderer 821, filterer 824, ranker 825 and diversifier 826 may function similarly to layout filter and ranker 45, ranker 48 and diversifier 49 as described U.S. Pat. No. 9,747,258 entitled "System and Method for the Creation and use of Visually-Diverse High-Quality Dynamic Layouts" granted 29 Aug. 2017 and assigned to the common assignee of the present invention and incorporated herein by reference. In particular, ranker 825 may perform according to parameters such as, the frequency a given option is selected (by the current user, other users or other "similar" users as discussed above), the progress made in using a specific choice (is the generated text based on choices used, saved or actually published), the similarity to other choices made by the user for other fields (e.g. comparing text alternatives for a field to choices made for other fields). Orderer 821 may order based on combining ranking and diversity information as described in U.S. Pat. No. 9,747,258.

Figure 11:
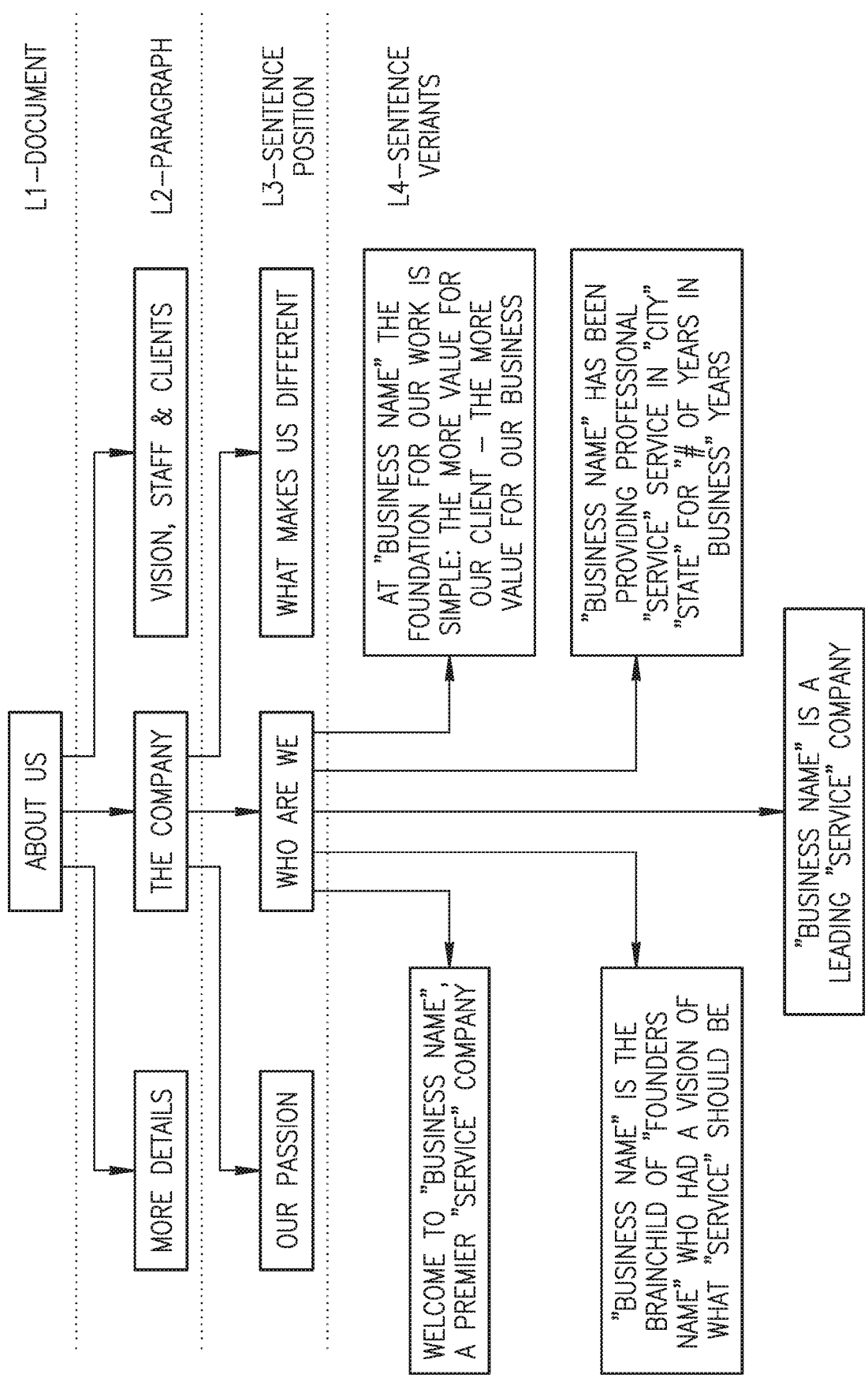
FIG. 11 is a schematic illustration of a sample hierarchical data structure; constructed and operative in accordance with the present invention.

Reference is now made to FIG. 11 which illustrates a sample hierarchical data structure. A typical embodiment that may employ a hierarchy may be level 1 (L1), the document (an option selection node), level 2 (L2), the paragraph ("ordered set" nodes), level 3 (L3) the sentence position ("ordered set" nodes) and level 4 (L4) sentence variants (an option selection node). Other levels may include content variants (an "ordered set" node) and words/punctuation and placeholders/additional elements etc. which are end-nodes. Additional end node elements may also include embedded objects in the text (such as pictures or shapes), hyperlinks (pointing within or out of the web site) and embedded website elements (such as operational buttons, "mail to" links etc.). Thus, a user creating text field content for a given role ("Our company") may choose one of the possible content variants as is illustrated (as an example only) in the table below, each of which consists of an ordered set of paragraphs. Each paragraph may consist of multiple sentence positions, each of which can be filled by one of a set of sentence variants. Each sentence variant consists of words, punctuations and placeholders. FIG. 11 may also be considered a partial hierarchical data structure reflecting some of the text options included in the table below:

| Paragraph | Sentence position | Sentence variants |
| --- | --- | --- |
| The Company | Who We Are | Welcome to *Business Name*, a premier *Service* company. *Business Name* is the brainchild of *Founders Name* who had a vision of what *Service* should be. |

-continued

| Paragraph | Sentence position | Sentence variants |
|---|---|---|
| | Our Passion | *Business Name* is a leading *Service* company.<br>*Business Name* has been providing professional *Service* services in *City*, *State* for *# of Years in Business* years.<br>At *Business Name* the foundation for our work is simple: the more value for our client - the more value for our business.<br>We love doing *Service*, and we like to think we're pretty darn good at it too.<br>At *Business Name* our passion for excellence is endless.<br>At *Business Name* we love doing *Service*, and we've been doing it for years.<br>Our love of our work drives who we are and what we do. Every. Single. Day.<br>What started out as a hobby has now become our passion and were delighted to share our passion with you.<br>Doing *Service* is what makes us tick. |
| | What makes us different | We are known for our *feature 1*, *feature 2* and *feature 3*<br>Our *feature 1*, *feature 2* and *feature 3* is what makes us different.<br>What sets us apart from the rest? Our *feature 1*, *feature 2* and *feature 3*.<br>What makes *Business Name* unique? We've got *feature 1* and *feature 2* and we're dedicated to providing superior customer service.<br>With over *# of Years in Business* of *Service* experience, we understand your needs and know how to give you solutions with superior results. |
| More Details | Year founded | *Founders Name* founded *Business Name* in *Year Founded* to offer the best *Service* services to customers.<br>We're your trusted resource for *Service* services since *Year Founded*.<br>Established in *Year Founded*, we're proud to have produced *# of Years in Business* years of happy customers.<br>We've been doing *Service* since *Year Founded*.<br>*Business Name* started up in *Year Founded*, and we've been on an epic ride ever since. |
| | Location (anywhere) | We'll work anywhere, and everywhere our clients need us. |
| | Location (multiple) | We have *# of Locations* locations: we were first founded in *Service City*, and have since opened branches in *City2* and *City 3*.<br>Our offices are located in *City*, *State*, *City 2*, *State 2* and *City 3*, *State 3*. |
| | Location | We strive to deliver the top *City*-based *Service* services you can find.<br>Our professional team serves clients all throughout *City*, *State* and the surrounding area. |
| Vision, Staff & Clients | What we are proud of | *Business Name* prides itself on its superior quality in *Service*.<br>We take pride in the *Service* work we do and in the long-term relationships we've built with our clients.<br>What makes us really proud? That every day we take the opportunity to try and do our job even better.<br>It busts our buttons to see a satisfied customer after a job well done.<br>We believe we don't just do *Service* - we build relationships one job at a time. And this makes us proud. |
| | Our Staff | We are a team of experienced, passionate, and curious people.<br>Great service begins with great people and real experience which is why we hire only the best, most qualified professionals in the business.<br>Who's on our team? The best and brightest of course.<br>Our team of dedicated professionals possesses a genuine desire to ensure that your experience with us is easy, convenient and satisfying.<br>What's our team all about? We believe in working together, working hard, and having fun along the way! |
| | Clients | To date, we've done work for *Client 1*, *Client 2* and *Client 3* among others.<br>Join the thousands of satisfied clients who chose *Business Name* for their *Service* needs.<br>We work with great companies and organizations, like *Client 1*, *Client 2*, and *Client 3*<br>We've had the privilege of working with over *# of clients* since *year founded* |
| In the Press | In the press | We've been so lucky as to have been recognized by *Publication 1* and *Publication 2* and blush ever so slightly when we mention it to clients. |

| Paragraph | Sentence position | Sentence variants |
|---|---|---|
| | | Our work has been recognized by publications including *Publication 1* *Publication 2* and *Publication 3*. |
| | | We've won a number of awards include the *Award 1*, *Award 2* and *Award 3*. |
| | | Check it out! We got some cool prizes for our work including *Prize 1* and *Prize 2* |
| | | *Business Name* has been featured by media outlets including *Publication 1* and *Publication 2*. |
| Finding Us | Contact us | Shoot us an email at *Email*, call us at *Phone* or get in touch the old-fashioned way by sending a letter to *Address*, *City*, *State*, *Zip*. We'd love to hear from you! |
| | | So, how can we help you? Contact us to get the conversation going! |
| | | Let's talk about what we can do for you! Email us at *Email* and we'll get the ball rolling . . . |
| | | So, what are you waiting for? Hire us! |
| | | We love open, honest feedback, and we love getting better at getting better, so get in touch and let us know how we're doing. |
| | | Get in touch with us to schedule an initial consultation with one of our experts. |
| | Visit us | For more information, please visit our wonderful team at *Address*. |
| | | Stop by to say hello to our professional team. We'd love to chat about how we can help you! |
| | | So, come on by and say hi! |
| | | We invite you to drop by and say hello to our team at *Address*. |
| | | We'd love you to visit us at *Address* or just shoot us an email to get the ball rolling! |
| | | Our office is at *Address*. Come on by and say hello. |

The table above provides a simplified example for a single content variant for an "About us" document (with *XXX* being a placeholder). It will be appreciated that the example provides multiple variants for the "location" sentence (location (anywhere), location (multiple) and single location), depending on the company's locations setup (internally defined or gathered from external business information) and the user may select which one to retain. This may also be performed using rules as further discussed in more detail herein below.

It will be appreciated that the hierarchy is typically created so the ordered sequences at each level can be freely edited. Thus, for example, the sentences for a specific paragraph are typically written in order to work well in any combination or sequence as seen in the above mentioned table. In fact, in one embodiment, orderer 821 may randomly re-arrange some or all of the sub-nodes of the sibling "ordered set" nodes. This has the benefit of making different sites based on the same hierarchical data structure more distinct from each other. Such randomized paragraph/sentence selection is better from a WBS vendor 61 point of view (i.e. the created sites are more diverse), and also from a search engine optimization point of view (as a search engine may penalize multiple sites which look similar).

It will also be appreciated that a hierarchical data structure may also contain "fixed" elements, e.g. sentences which cannot be changed, cannot be moved or have no alternatives (given that the user decided to select the sub-hierarchy containing such sentences). Such elements could however be modified as part of the regular text field editing in the WBS editor 30.

Deleter 822 may delete nodes as a result of user editing, and creator 823 may create new nodes accordingly (also based on user editing and entered text). They may also provide similar capabilities to deletion and creation of other entities such as roles and complete hierarchical data structures.

In alternative embodiments, system 200 may employ a different hierarchy, including hierarchies with more or less levels or a hierarchy using additional or different node types. Furthermore, as discussed in more detail herein below, the hierarchy may be dynamic as it may be modified during operation based on recommendations made by analysis engine 83.

In some embodiments the hierarchical data structure may also re-use certain sub-trees, which may be hooked in different places. Thus, the original version of the hierarchical data structure (before user modifications) may be a single-root directed acyclic graph.

It will be appreciated that placeholders are internal field markers which can be filled by information such as company name, person name etc. as described herein above. Placeholders may be site-global (e.g. company name) or local to a given page or site area (specific product details for a multi-product site). System 200 may have this information from earlier interactions with the user through the generation questionnaires, from other places in the website or from other sources (e.g. user's social network presence) as described in U.S. Pat. No. 10,073,923.

As discussed herein above, the user may interact with TCG system 80 and may edit hierarchical data structures via HDS editor 84 which supports performing the hierarchical data structure operations above for a given text field. When entering a text field, the user may invoke HDS editor 84 using (for example) a "help me write" button added to WBS editor 30

It will be appreciated that HDS editor 84 may allow a user to preview a suggested alternative generated by analysis engine 83 (as discussed in more detail herein below) based on the chosen field's hierarchical structure according to filtering/ranking/diversification as described herein above in relation to HDS/rule handler 82. Placeholders may be marked as such, and filled with initial values (when known) as well.

HDS editor 84 may also allow a user to browse and select alternatives at all levels (e.g. with sentence positions having multiple alternatives via an option selection node).

It will be appreciated that other capabilities of HDS editor 84 may be the ability to allow a user to edit sequences, e.g. delete and move elements (such as sentences), and to fill in and edit placeholder values. Some embodiments of system 200 may allow the user to insert new text inside HDS editor 84 without having to enter a separate editing session in WBS editor 30 as discussed in more detail herein below.

HDS editor 84 may also provide an option which allows the hierarchy to be modified which really applies only to a local hierarchical data structure instance associated with the field. This could be, for example, if the user would like to move a sentence from one paragraph to another paragraph of the same field (or of another field entirely). Such a move may disengage the hierarchical data structure sub-tree associated with the moved sentence from its original position (inside one paragraph's hierarchical data structure sub-tree) and re-attach it to another paragraph's hierarchical data structure sub-tree.

In an alternative embodiment, HDS editor 84 may also allow final text editing at this point, though this function is typically reserved to the website building system's text component editor (inside WBS editor 30), such editing may include insertion of additional text, deletion of nodes and arbitrary editing of text elements. In this embodiment, HDS editor 84 may further comprise an analysis-based text creator 841, based (for example) on analyzing an image related to the text field (via an image feature analysis engine) and creating a matching written description or caption for the specific image.

It will be appreciated that in editing mode (as shown in FIG. 8 back to which reference is now made), HDS editor 84 may load an initial version of the hierarchical data structure from HDS repository 523 as described herein above. However HDS editor 84 may activate analysis engine 83 to determine an initial text offering (which may include filtering, ranking, diversifying, selecting, re-ordering and deletion of elements of the initial hierarchical data structure via HDS/rule handler 82 as described herein above) to create the initial version of the to-be-edited hierarchical data structure. This may include selecting the highest ranked combination, so that the user may immediately start with the best offer that TCG system 80 can make. As discussed herein above, the actual modifications to the hierarchical data structures are managed by HDS/rule handler 82 (which acts as data management backend to the HDS editor 84 front-end). The user may always modify this proposed hierarchical data structure via HDS editor 84. During re-edits, HDS editor 84 may use the preserved editing context from the previous sessions as described in more detail herein below.

Figure 12A:
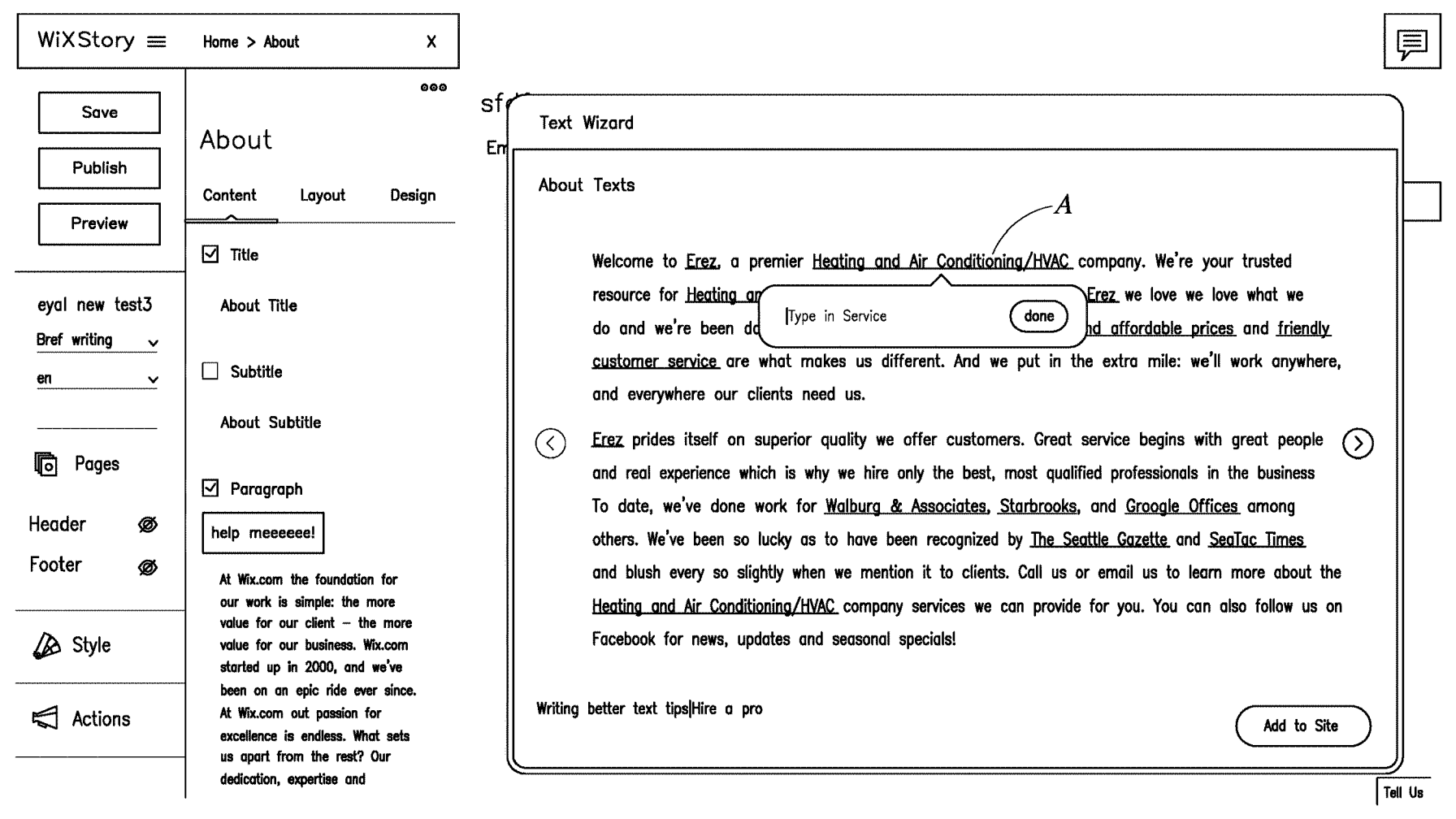
Figure 12C:
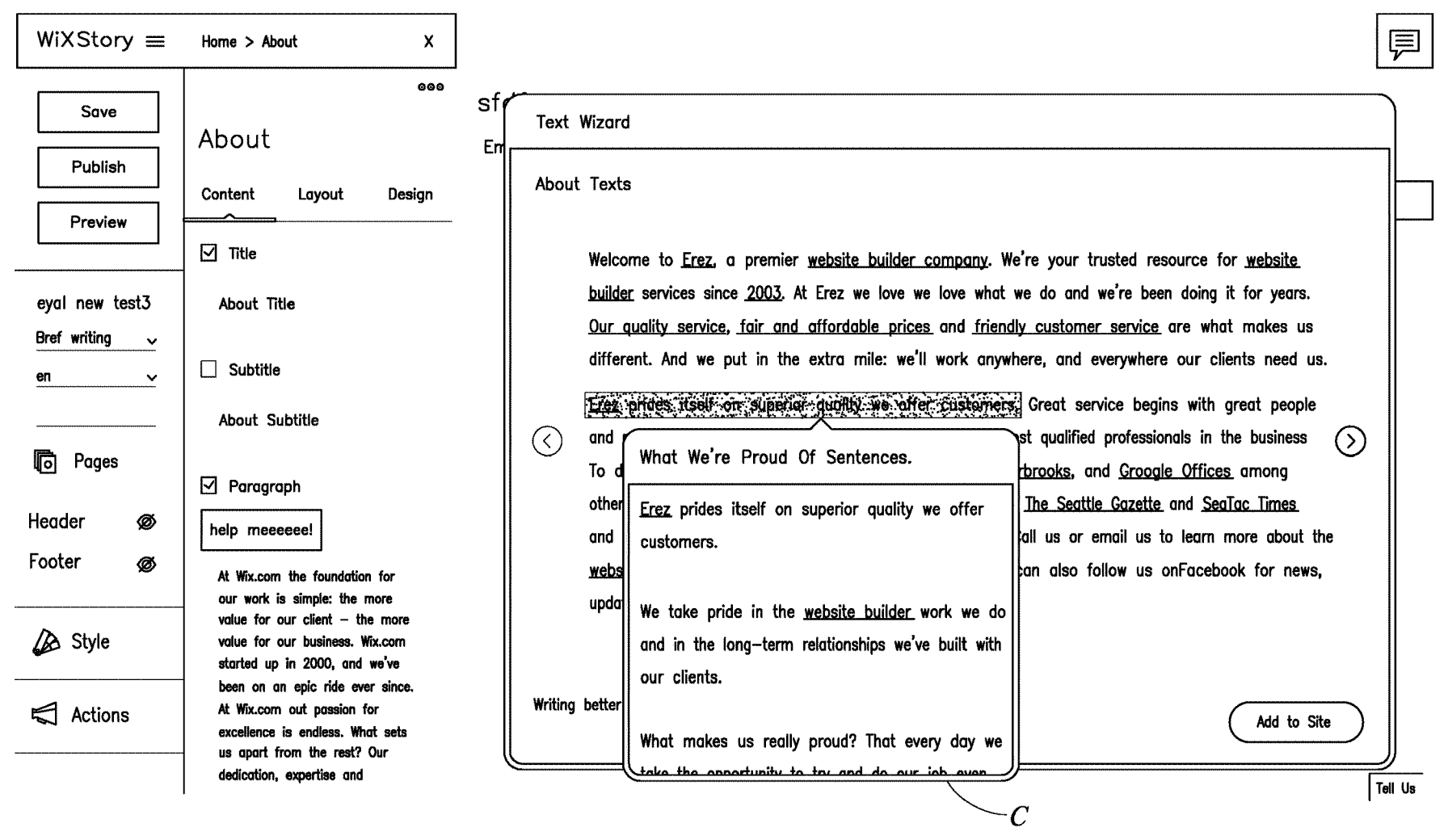

Reference is now made to FIGS. 12A, 12B and 12C which illustrate an example user interface for HDS editor 84. FIG. 12A illustrates the editing of a placeholder showing the company's offered service ([A]). FIG. 12B illustrates the browsing screen. It will be appreciated that the "<" and ">" buttons ([B]) may switch to a different top-level alternative text (i.e. hierarchical data structure). FIG. 12C illustrates an alternative sentence selection, as the mouse passes over a sentence for which alternatives are available, a pop-up menu ([C]) shows the different alternatives available for this sentence, filtered and ranked as described herein below It will also be appreciated that the displayed sentence alternatives already include the updated placeholder values when available.

It will be further appreciated that given the ability to re-order and remove specific sub-elements (such as sentences), HDS editor 84 may provide a "physical building block" UI metaphor, similar to children's games in which blocks bearing text captions are arranged.

HDS editor 84 may enable the user to edit an instance of a per-role hierarchical data structure which is specific for the given text field in the given page. The edited instance is initialized using the per-role hierarchical data structure (with element choices made according to the filter and ranking algorithms), but later changes are made to the specific hierarchical data structure instance for this field.

Figure 13A:
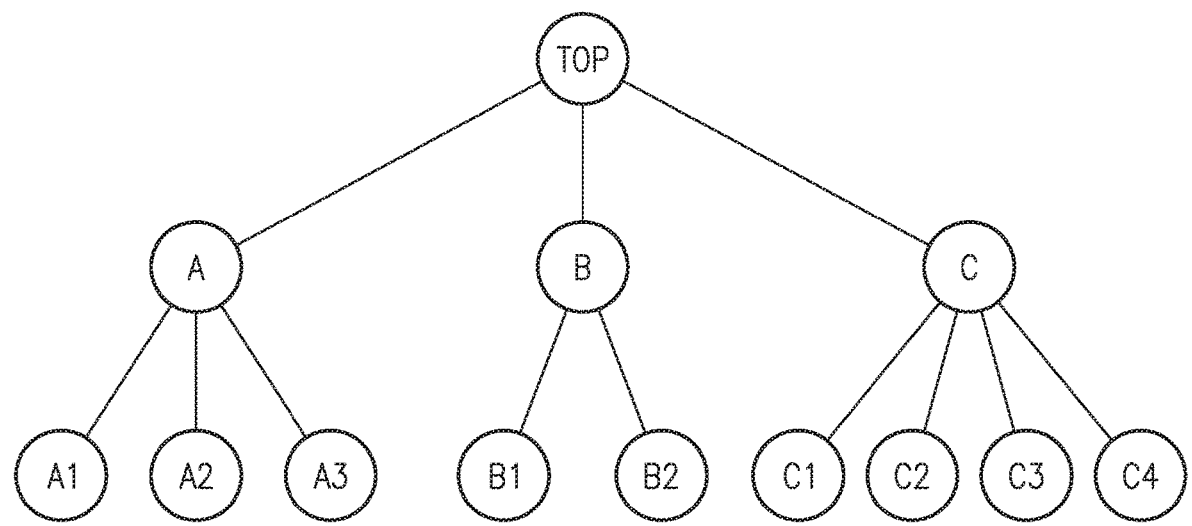
FIGS. 13A-13D are schematic illustrations of changes to a sample hierarchical data structure for which context should be preserved; constructed and operative in accordance with the present invention.

HDS editor 84 may also provide editing context preservation. Reference is now made to FIGS. 13A-13D which illustrate changes to a simple hierarchical data structure. In FIG. 13A, the top level has 3 possible alternatives (via a "select one of" node) which are A, B and C. Each of these in turn consists of a sequence of sub-nodes (e.g. sentences)—A1-A3, B1-B2 and C1-C4.

Figure 13B:
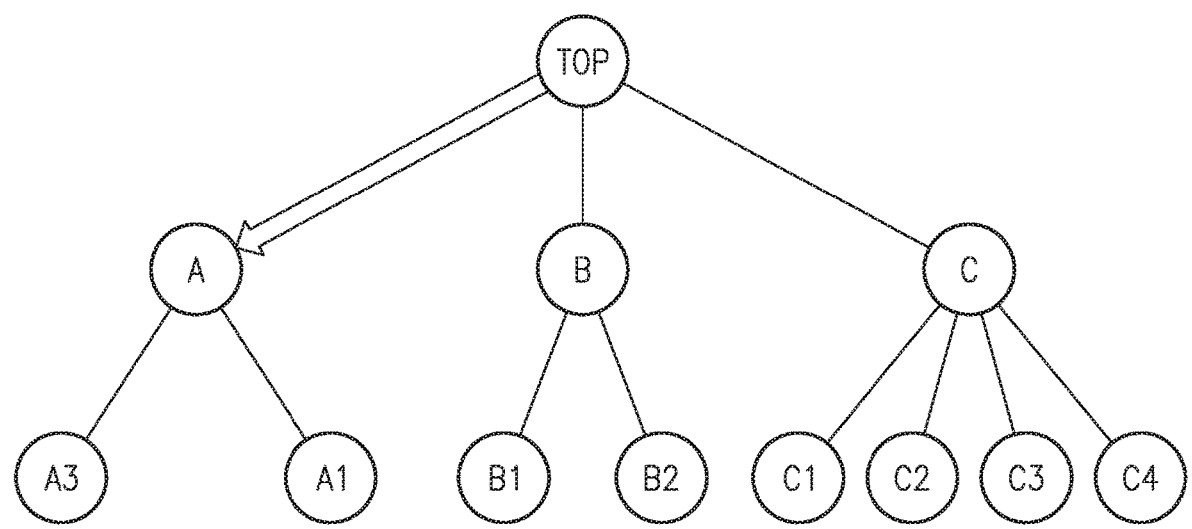
Figure 13C:
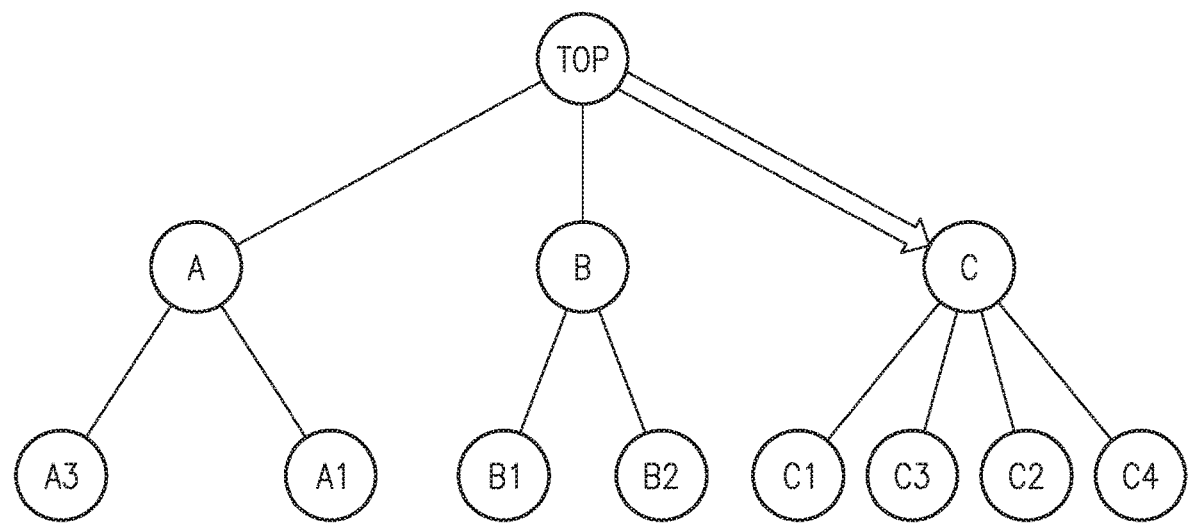

The user may (for example) start with an alternative A by making changes to it, for example by deleting A2 and changing the order of the remaining A1 and A3, thus generating the final sequence A3, A1 (instead of A1, A2, A3) as illustrated in FIG. 13B. After this, the user may change his mind and switch to alternative C and edit it as well e.g. changing the order of C2 and C3 as illustrated in FIG. 13C.

Figure 13D:
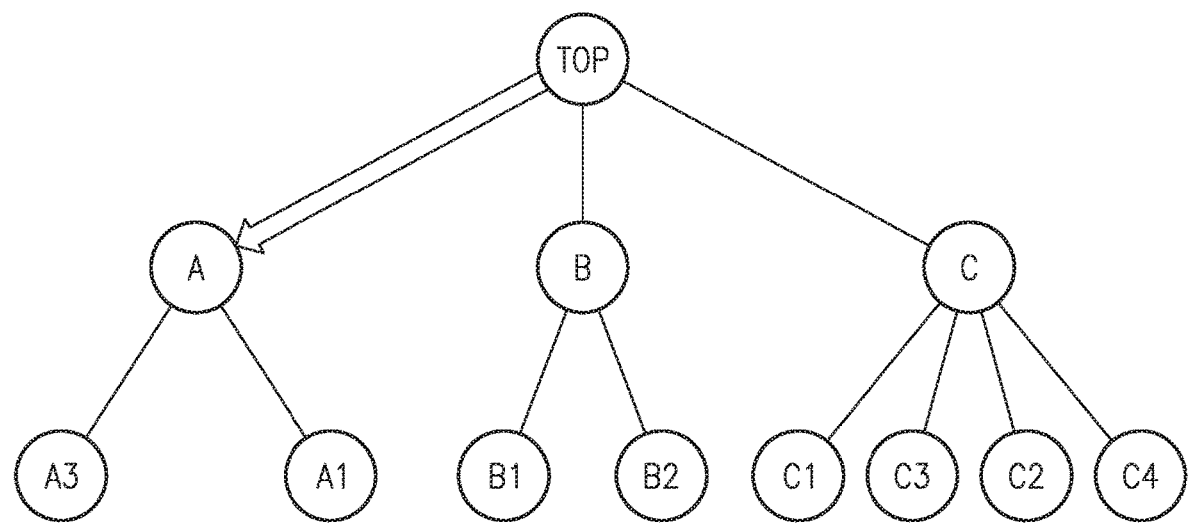

HDS editor 84 may preserve the editing context, so that if the user decides to leave alternative C and return to alternative A, he would return to the edited alternative A (i.e. A3, A1) rather than the original alternative A (A1, A2, A3) as illustrated in FIG. 13D.

It will be appreciated that context is preserved at all levels, so each sub-tree is preserved with its changes. The context is a per field instance, so (for example) if an e-store has multiple product pages, each of which contains a product description, the context is saved separately for each product description field instance. HDS/rule handler 82 may save the preserved context in HDS local instances repository 5233 together with the "visible context" describing current user choices.

As discussed herein above, the original version of a hierarchical data structure may be a directed acyclic graph (with multiple-hooked/repeated sub-trees) rather than a simple tree. Once the user starts editing the hierarchical data structure via HDS editor 84, the repeated sub-trees are duplicated (by HDS instance creator 842) for each place where they are referenced. This is required since different copies of a repeated sub-tree may be modified in a different manner. The duplication can be delayed until the actual repeated sub-tree is actually modified (i.e. using a form of lazy evaluation in HDS instance creator 842).

The user may direct HDS editor 84 to complete editing and to instruct text generator 86 to generate the text into the text field. HDS editor 84 may also warn the user (via a pop-up or other user interface element) if some of the required placeholders have not been filled, or still contain the original sample text which is (typically) irrelevant to the user's business.

As discussed herein above, HDS editor 84 may invoke analysis engine 83 to determine an appropriate hierarchical data structure for the pertinent text field.

It will be appreciated that for an option selection node, HDS/rule handler 82 may filter, order and diversify the proposed sub-nodes and for any sibling "ordered set" nodes, may offer the set and its order. For placeholders, analysis engine 83 may determine the value selected for them from the information available as described herein above.

It will be appreciated that for the sake of clarification, the initial (stored) hierarchical data structure definition for a given role includes the full node type information (i.e. which sub-nodes are associated with the given node and what is their order). However, HDS editor 84 may invoke analysis engine 83 to determine which combination may be displayed and HDS/rule handler 82 may modify the stored hierarchical data structure instances (as described herein above) and to determine which alternatives to offer to the user at various levels and in which order.

As discussed herein above, analysis engine 83 is activated when HDS editor 84 is initialized (to provide recommendations for the displayed initial choice), and is also operated on-line during hierarchical data structure editing via HDS editor 84. This is done in order to affect choices displayed to the user (e.g. if the user wants to review alternatives for a given sentence), and possibly also to recommend or automatically affect actions (e.g. if the user made a certain editing change, a rule may offer an additional change or affect it automatically).

Reference is now made back to FIG. 5 which illustrates the elements of analysis engine 83. Analysis engine 83 may further comprise AI/ML engine 831, NLP engine 832 and a rule engine 833. As discussed herein above, analysis engine 83 provides all services for TCG system 80 based on artificial intelligence/machine learning, natural language processing and general rules. Amongst its tasks, analysis engine 83 may help role determiner 81 select a role for a text field and may select hierarchical data structures for a given field and role It will be appreciated that the elements of HDS/rule handler 82 may be activated as a result of analysis performed by AI/ML engine 831, NLP engine 832 or rule engine 833 as discussed in more detail herein below.

Analysis engine 83 may use rules as stored in TCG analysis rules repository 525. It will be appreciated that the rules may be pre-defined by WBS vendor staff 61 or created and developed as a result of artificial intelligence, machine learning, website analysis, crowd sourcing etc. as described in more detail herein below.

As discussed herein above, analysis engine 83 may be used again in re-edits, as the suggested alternatives at each tree level may change over time, e.g. due to changes to the input data evaluated by analysis engine 83 which change the ranking and display order of alternative text options offered to the user when editing not-yet-selected elements of the text. An example would be changes in the popularity of a given text option (based on analysis of selections made by other users) which affect an area of the hierarchical data structure which has not yet been edited by the user.

Diversifier 826 may select from HDS repository 523, alternative hierarchical data structures based on these alternatives providing a diverse set of text options, i.e. being different from each other and from the current selected text.

It will be appreciated that rules may also recommend or affect adaptations, i.e. node adapter 827 may apply changes to the hierarchical data structure such as the removal of nodes/sub-trees as a result of text changes to existing nodes (and rule adapter 828 may also adapt changes to rules accordingly as a result of analysis engine 83) Thus, analysis engine 83 may determine that since the user specified the company address when editing a "company description" node in an "about us" field, the separate company address sentence is no longer necessary.

Analysis engine 83 may also apply a set of rules that determine any of the above based on available input information. Analysis engine 83 may analyze input information including any of the information detailed above for role determiner 81 to use in determining the field role as well as additional information (such as that gathered by internal data gatherer 951 and external data gatherer 952). Such information may include predefined template information, user specified information, site generation system information and field information for current and other fields (including non-text fields which may still be analyzed, e.g. image fields analyzed though image understanding algorithms). Other input information considered by analysis engine 83 (and gathered by gatherer 95) may also include information gathered from the user and other users of the website building system including profile information, the analysis of current and other sites (both within and outside of the web site building system), related field information and any draft text entered into the field.

Analysis engine 83 may also analyze information including crowd source information (as gathered by crowd source data gatherer 953) from end-users of current site, or other sites of system 200 (e.g. sites using the same template or hierarchical data structures) such as information regarding the success of site, gathered business intelligence (BI) and usage statistics, information regarding the popularity of the specific page and information regarding explicit end-user ranking (e.g. in systems which have a "how much was this page useful to you?" question such as blogs and support article systems). It may also analyze information regarding measurement of user engagement (e.g. reading time, mouse movement, page scrolling, user biological feedback tracking such as eye motion detection) and information regarding implicit tests indicating user understanding of the content (system or designer-originated).

It will be appreciated that system 200 may further employ any of the techniques described in U.S. Pat. No. 10,073,923 for crowd-source data gathering and analysis. Thus, analysis engine 83 may evaluate and analyze information from what other users did, including both designer info and end-user info. Any such analysis may be performed on a large scale statistical basis, and would be subject to users' privacy, anonymity and legal rights.

Analysis engine 83 may also consult (e.g. through internal data gatherer 951) with explicit hints included in the elements of the webpage, website or website building system to guide its operation. Such hints may be applicable to any analysis and recommendations performed by analysis engine 83, such as related to field role determination/ selection, hierarchical data structure selection for a given role/field and hierarchical data structure customization for a specific hierarchical data structure (both initially and during editing). Such hints may be included in the user profile, at the website level data or settings, with additional site information (code associated with the site, meta data etc.), with site generation system 40 entities used to generate the site (content elements/types, layout elements/types etc.), templates (at all levels, site, page, section etc.) component definitions and instances and added applications (such as third party applications or list applications) etc.

Thus, for example, a rule may specify a different preferable order for the paragraphs or specific sentence in an "our services" page of a US real-estate lawyer as compared to a European real-estate lawyer. Such a rule may be predefined, or dynamically created based on analysis of actual use patterns by the relevant users.

It will be appreciated that rules may also be horizontal, i.e. the recommendation for a given field X may depend on the selected elements and their order for other areas of field X or even a separate field Y (of the same page or another page in the web site). For example, analysis engine 83 may detect that the user prefers a certain style based on his answers for a given field, and prioritize that style for other fields as well. TCG analysis rules repository 525 may also include rules on which sentences work best together.

As discussed herein above, analysis engine 83 may use a repository of pre-define rules (created by the WBS vendor staff 61 and stores in TCG analysis rules repository 525), which may also be dynamically modified as described in more detail herein below. AI/ML engine 831 may use artificial intelligence and machine learning (and deep learning in particular) to analyze the input data and the user activity and produce recommendations for HDS/rule handler 82 regarding node filtering, ranking, diversification and ordering. It will be appreciated that AI/ML engine 831 may modify its own data structures (such as neural network models) based on its interaction with system 200 and its learning process. AI/ML engine 831 may also save updated versions of such data structures in ML/AI repository 515 or a separate matching counterpart repository within CMS 55.

It will also be appreciated, as the usage of system 200 grows, the input information becomes statistically significant for additional (and more detailed) segments of the population. Thus, for example, once a sufficient number of construction related businesses use system 200, system 200 may be able to offer better results to such businesses. This process creates a set of positive feedback loops, thereby improving system 200.

It will also be appreciated that in this scenario there may be 2 levels of feedback loops, website building system⇔designers and designers⇔end users. For each level system 200 may develop multiple feedback loops, as loops are developed for each user segment. It will be appreciated that the feedback loops may be considered a property of a system 200 general interaction (for example the interaction between designers 62 and site users 63) as a result of system 200 behavior. Thus it is not an explicit feature supported by the specific sub system elements of system 200.

As discussed herein above, analysis engine 83 may use rule engine 833 as well as the AI/ML engine 831 and NLP engine 832 based analysis and the gathered data by data gatherer 95 to make a determination as to how HDS/rule handler 82 should behave regarding the filtering, ranking and ordering of hierarchical data structures, nodes and roles. However, system 200 may also use the gathered data to extend or modify the hierarchical data structure and possibly the rules associated with it using node adapter 827 and rule adapter 828.

In particular, as the number of users of system 200 (and the amount of data collected from them) increases, analysis engine 83 may analyze the user responses to detect specific patterns. These may include in particular recurring editing changes made to the generated texts.

For example, a given hierarchical data structure node X (e.g. a paragraph) consists of a sequence of 3 sub-nodes A, B and C (e.g. sentences) in this order. Based on the editing operations of users who selected the node X, it turns out that most of them change the order of the 3 sub-nodes into C,A,B. Furthermore, it is assumed that this recurring editing behavior is consistent across a large number of users (which is also a majority). In such a scenario, analysis engine 83 may determine that the hierarchical data structure should be re-arranged in order to present a C,A,B sequence initially, saving the extra editing operation which would have been performed by most users and may instruct HDS/rule handler 82 accordingly.

It will be appreciated that as the number of users grows, analysis engine 83 may make finer analyses which take into account specific parameters of the user (such as his profile details or information about his site). Thus, if a sufficient number of photographers in Spain make a given editing change, analysis engine 83 may decide to pre-apply the recurring change to future users who are also photographers in Spain.

It will be appreciated that the changes to the hierarchical data structure are not limited to changes in sub-node ordering (or option filtering and ranking). Node adapter 827 may also delete sub-nodes (possibly using deleter 822).

It will also be appreciated that in typical embodiments, the addition of text cannot be done via HDS editor 84 (which is typically limited to manipulation of existing hierarchical data structures). However, users may add additional text via WBS editor 30 which may be incorporated into the hierarchical data structure via visual editor coordinator 85.

NLP engine 832 may analyze the texts added by multiple users to the same hierarchical data structure nodes in order to detect common themes and texts or to generate common denominator text, and may use the result of such analysis to instruct node adapter 827 and rule adapter 828 to extend the hierarchical data structures adding additional nodes and possibly associated rules.

Thus, if a statistically significant number of photographers add one of 3 possible similar sentences to their business descriptions, NLP engine 832 may detect such an occurrence through its natural language analysis and instruct node adapter 827 to create additional sub-nodes extending the "business description" node. In this scenario, node adapter 827 may create 1 "select one of" sub-node and 3 end-nodes (for the 3 sentences).

In an alternative embodiment, analysis engine 83 may present the results of the analyses above to the WBS vendor staff 61 responsible for content authoring (and thus for hierarchical data structure creation and maintenance). WBS vendor staff 61 may then use the information to decide whether to update any hierarchical data structures.

It will be appreciated that such results may include (for example) usage statistics, success information for text used (based on BI (business information) or end-user feedback as noted above) or other types of information gathered by data gatherer 95 as described herein above.

The information may also include common variants of text written by users for specific roles and specific text components in templates. It will be appreciated that such information may greatly facilitate the creation and maintenance of HDS repository 523. For example, WBS vendor staff 61 also may manually remove options which are un-popular or not successful, or create new text alternatives based on commonly used text.

It will be appreciated that a user may edit the generated text when editing the containing page using WBS editor 30. Such editing may break the connection between the generated text and the original hierarchical data structure and hierarchical data structure sub-elements selection and ordering.

However, once such visual editing is performed, the text field does not match the saved hierarchical data structure editing context for the field. If the user wants to return to HDS editor 84 and re-work the text, he may lose the changes made in WBS editor 30. Furthermore, some of the possible editing changes cannot be represented in the hierarchical data structure for example, merging two sentences into a single combined sentence.

It will be appreciated that the ability to return to HDS editor 84 may be important in some cases. Thus, the system may use visual editor coordinator 85 in order to attempt to maintain the correspondence between the text structure and the HDS structure (if only partially).

For placeholders, system 200 may support the continuous maintenance of placeholder information during visual editing. Thus, visual editor coordinator 85 may lock placeholders against accidental changes, so their value may be refreshed (e.g. if the underlying data changes). Alternatively, system 200 may allow placeholders to be refreshed on underlying value change, but would warn the user and flag these placeholders which have been modified in WBS editor 30.

In an alternative embodiment, HDS editor 84 may be integrated with WBS editor 30. The single combined editor may provide both hierarchical data structure editor services and visual editor services. The same text field underlying data structure would represent both hierarchical data structure information and text field information. Some editing operations (such as sentence combining) may break the hierarchical data structure associations for this area. Visual editor coordinator 85 may provide tracking of editing changes, and may allow the user to apply a "return to the generated text" for a specific text area (rather than the entire field).

In another alternative embodiment, system 200 may maintain back-pointers from the in-field text structure to the hierarchical data structure. Thus, changes made during editing are also sent to visual editor coordinator 85 and applied (if possible) to the field's hierarchical data structure instance. This could also be implemented by saving a set of edit change records which would be re-applied later to the hierarchical data structure.

Once the content has been finalized and approved by the user for the text field, text generator 86 may linearize the hierarchical data structure and generate the text for the text field. This is text that will be shown on the website when the site is generated using site generation system 40 or otherwise inserted into the webpage displayed to site designers 62 and site users 63.

It will also be appreciated system 200 may also benefit SEO (search engine optimization) for the website being built since different sites created using the same template use different text content and are not too similar. HDS SEO builder 88 may further use information available in the site's hierarchical data structure instances to inject specific SEO-related information (such as keywords and metadata) into the generated/edited site to be accessed by the relevant spider/search engine.

In one embodiment, the hierarchical data structure may include SEO keywords associated with nodes at all levels (e.g. associated with some or all of the sentences or paragraphs). The selection of a given node will cause the SEO keywords associated with that node to be added to the pages' META header.

NLP engine 832 may also extract SEO keywords from text that is added or modified when editing the generated text in WBS editor 30. In particular, system 200 may assume that changes made in WBS editor 30 to the text generated by TCG system 80 are more important, specific or relevant to the current site. Thus, such specific textual modifications may be good candidates for keyword extraction for the pages' META header.

In another embodiment, system 200 may use information from the site's predefined SEO keyword and meta-data. These could be specified by the user or part of a template (site or otherwise) selected by the user (e.g. a bakery template may have "bread, cakes, . . . "). Such information may be added to the information collected by data gatherer 95 to determine any filtering, ranking and ordering of hierarchical data structure nodes by HDS/ruler handler 82.

System 200 may also support integration by providing text kit extraction and kit re-integration capabilities with services external to the website building system. Text kit interface 89 may extract and re-integrate a text kit containing all relevant text field content and association to their place on the website. The extracted text may include just the current field content or an extended part of the related hierarchical data structure. The kit may include information about a single text field or multiple text fields.

The kit may also contain additional related information. For example, the kit may contain business classification information (such as business family and industry) or other metadata. This information may be used by a translation marketplace site (such as Fiverr.com) to classify and route the required services request to the right place in the marketplace. It will be appreciated that text kit re-integration entails extracting and re-integrating the modified text kit into the web site.

The pertinent website building system may also support having text fields with multiple versions (e.g. per language) stored in parallel. In such scenarios, the hierarchical data structure and the text kits may also be required to support such multiple versions.

It will be appreciated that TCG system 80 (and the user's activity and choices when interacting with it in particular) may affect other parts of system 200, including parts not directly related to any specific text field. Affected areas may include additional user interaction with WBS editor 30 as well as other parts of system 200.

For example, the users' activity within TCG system 80 may affect the way system 200 provides the user with content for non-text fields. Thus, the choices the user makes when creating the text content for an "About Us" field may affect the type of images, video or audio offered to the user for a non-text field. The affect may include (for example) changes to the selection and ranking of offered media objects, or the inclusion of additional media sources in the offered media collection. A user (in given business/industry) who selected (for example) "service oriented" branches of the "About Us" hierarchical data structure for a given field/role may be offered media which emphasizes human interaction. On the other hand, a user who selected the "product oriented" branches of this hierarchical data structure may be offered media which highlights the products typical to the given industry.

It will be appreciated that there may be a number of possible embodiments for such a "reverse hints" mechanism which can also be combined. In one embodiment, elements of TCG system 80 (such as nodes) may include reverse hints provided to WBS editor 30 and these may be provided to WBS editor 30 in conjunction with the generated linearized text through text generator 86. In another embodiment, WBS editor 30 may include (for example) a suggested media recommender component. The recommender may consult with analysis engine 83 (or directly with the appropriate elements of CMS 55) to provide media recommendations to the editing user working within WBS editor 30.

Thus system 200 may generate text to support website building having final text that is a combination of hierarchical data structure pre-defined content, additional system adaptations, manipulations and selections by the user, information filled into place holders and free text based on writing or editing by the user.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer or a client/server configuration selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A tool for a website building system, the tool implemented on at least one processor and a memory, the tool comprising:
    a database storing a plurality of text options, each text option formed of a hierarchical data structure (HDS) associated with a field role, said text option based on information gathered from said website building system and from sources external to said website building system, each said HDS having nodes and sub-trees representing field content, text paragraphs and sentences;
    a role determiner to receive and determine a field role for an editable text field of a website, said website being at least one of: edited and generated with said website building system;
    an analysis engine to make at least one text option recommendation from said database for said field role;
    an HDS editor to enable a user to select one recommended text option for said text field and to enable editing a local instance of an HDS of said text option including at least editing nodes and sub-trees of said local instance of said HDS; and
    a text generator to linearize said local instance and to generate the text for said text field for at least one of: a site generation system and an editor of said website building system.

2. The tool according to claim 1 and further comprising said analysis engine to analyze said information and to make change recommendations regarding the structure and content of said HDSs, field roles and rules, wherein said analysis is based on rules.

3. The tool according to claim 2 wherein said rules are pre-determined.

4. The tool according to claim 2 and further comprising:
    an HDS/rule handler to manage modifications to at least one entity, said modifications from said HDS editor and from said text option recommendation and said change recommendations from said analysis engine, wherein said at least one entity is one of: a role, a rule, a node and a sub tree; and
    a data gatherer to gather said information.

5. The tool according to claim 4 and further comprising at least one of:
    an HDS SEO (search engine optimization) builder to generate SEO specific SEO information based on said generated text and to provide SEO data for said data gatherer; and
    a text kit interface to provide text kit extraction and kit re-integration capabilities for services external to said website building system.

6. The tool according to claim 5 and further comprising an HDS/rule coordinator to coordinate between said role determiner, said analysis engine, said HDS editor, said text generator, said database; said HDS/rule handler, said data gatherer, said HDS SEO builder and said text kit interface.

7. The tool according to claim 4 and further comprising a visual editor coordinator to coordinate editing sessions between said HDS editor and said editor of said website building system.

8. The tool according to claim 3 wherein said analysis engine comprises at least one of:
    an AI (artificial intelligence)/ML (machine learning) engine to analyze said information and to make said at least one text option recommendation and said change recommendations using artificial intelligence and machine learning techniques;
    a NLP (natural language processor) engine to analyze said information and to make said at least one text option recommendation and said change recommendations using natural language processing techniques; and
    a rule engine to determine the functionality of said HDS/rule handler regarding said entities according to said rules.

9. The tool according to claim 3 wherein said HDS editor comprises:
an HDS creator/editor to create and edit a basic HDS definition;
an HDS instance creator to create and edit an HDS instance from said basic HDS definition;
a role creator/editor to create and edit initial role assignments for said basic HDS; and
a rule creator/editor to create and edit said rules.

10. The tool according to claim 4 wherein said HDS/rule handler comprises:
an orderer to generally order said at least one entity;
a deleter to generally delete said at least one entity;
a creator to generally create said at least one entity;
a filterer to generally filter said at least one entity;
a ranker to generally rank said at least one entity;
a diversifier to diversify said at least one entity;
a node adapter to apply changes to said HDS; and
a rule adapter to apply changes to said rules.

11. The tool according to claim 4 and wherein said data gatherer comprises at least one of:
an internal data gatherer to gather said information from within said website building system;
an external data gatherer to gather said information from resources external to said website building system; and
a crowd source data gatherer to gather crowd source information to collect crowd source information to test an HDS.

12. The tool according to claim 1 wherein said text field is at least part of one of: a layout element, a layout group and a preset page section.

13. The tool according to claim 1 wherein said generated text comprises placeholder text from at least one of said site generation system, said data gatherer, said database and a user of said website building system.

14. The tool according to claim 1 wherein said database stores a field role association, HDS definitions and HDS local instances for each said HDS.

15. The tool according to claim 1 wherein said nodes and said sub-tree comprise at least one of: an option selection node, a sequence of nodes and an end node.

16. The tool according to claim 15 wherein said end node comprises embedded objects having non-text data.

17. The tool according to claim 9 and also comprising said HDS editor to preserve context during said editing for said HDS.

18. The tool according to claim 2 wherein said at least one text option recommendation and said change recommendations are based on hints from said website building system.

19. The tool according to claim 1 and also comprising said tool to provide hints to said website building system based on at least one of: said analysis engine and user activity for said website building system.

20. A method for a website building system, the method comprising:
storing a plurality of text options, each text option formed of a hierarchical data structure (HDS) associated with a field role, said text option based on information gathered from said website building system and from sources external to said website building system, each said HDS having nodes and sub-trees representing field content, text paragraphs and sentences;
receiving and determining a field role for an editable text field of a website, said website being at least one of: edited and generated with said website building system;
using an analysis engine to make at least one text option recommendation from said database for said field role;
enabling a user to select one recommended text option for said text field and enabling editing of a local instance of an HDS of said text option including at least editing nodes and sub-trees of said local instance of said HDS; and
linearizing said local instance and generating the text for said text field for at least one of: a site generation system and an editor of said website building system.

21. The method according to claim 20 and further comprising using said analysis engine to analyze said information and to make change recommendations regarding the structure and content of said HDSs, field roles and rules, wherein said analysis is based on rules.

22. The method according to claim 21 wherein said rules are pre-determined.

23. The method according to claim 21 and further comprising:
managing modifications to at least one entity, said modifications from said enabling a user to select and said enabling editing, and from said text option recommendation and said change recommendations from said using an analysis engine, wherein said at least one entity is one of: a role, a rule, a node and a sub tree; and
gathering said information.

24. The method according to claim 23 and further comprising at least one of:
generating SEO (search engine optimization) specific SEO information based on said generating the text and providing SEO data for said gathering said information; and
providing text kit extraction and kit re-integration capabilities for services external to said website building system.

25. The method according to claim 24 and further comprising coordinating between said receiving and determining a field role, said using an analysis engine, said enabling a user to select and said enabling editing, said linearizing said local instance and generating the text, said storing, said managing modifications, said gathering information, said generating SEO specific SEO information and said providing text kit extraction and kit re-integration.

26. The method according to claim 23 and further comprising coordinating editing sessions between said enabling a user to select and said enabling editing and said editor of said website building system.

27. The method according to claim 21 wherein said using an analysis engine comprises at least one of:
analyzing said information and making said at least one text option recommendation and said change recommendations using artificial intelligence and machine learning techniques;
analyzing said information and making said at least one text option recommendation and said change recommendations using natural language processing techniques; and
determining the functionality of said managing modifications regarding said entities according to said rules.

28. The method according to claim 22 wherein said enabling a user to select and said enabling editing comprises:
creating and editing a basic HDS definition;
creating and editing an HDS instance from said basic HDS definition;
creating and editing initial role assignments for said basic HDS; and
creating and editing said pre-determined rules.

29. The method according to claim 23 wherein said managing modifications comprises:
- ordering said at least one entity;
- deleting said at least one entity;
- creating said at least one entity;
- filtering said at least one entity;
- ranking said at least one entity;
- diversifying said at least one entity;
- applying changes to said HDS; and
- applying changes to said rules.

30. The method according to claim 23 and wherein said gathering information comprises at least one of:
- gathering said information from within said website building system;
- gathering said information from resources external to said website building system; and
- gathering crowd source information to collect crowd source information to test an HDS.

31. The method according to claim 20 wherein said text field is at least part of one of: a layout element, a layout group and a preset page section.

32. The method according to claim 20 wherein said generated text comprises placeholder text from at least one of said site generation system, said gathering said information, said database and a user of said website building system.

33. The method according to claim 20 wherein said storing stores a field role association, HDS definitions and HDS local instances for each said HDS.

34. The method according to claim 20 wherein said nodes and said sub-tree comprise at least one of: an option selection node, a sequence of nodes and an end node.

35. The method according to claim 34 wherein said end node comprises embedded objects having non-text data.

36. A method according to claim 28 and also comprising said enabling a user to select and said enabling editing preserves context during said editing for said HDS.

37. The method according to claim 21 wherein said at least one text option recommendation and said change recommendations are based on hints from said website building system.

38. The method according to claim 20 and also comprising providing hints to said website building system based on at least one of: said using an analysis engine and user activity for said website building system.

* * * * *